United States Patent [19]
Yanagi et al.

[11] Patent Number: 5,788,281
[45] Date of Patent: Aug. 4, 1998

[54] VEHICLE OCCUPANT RESTRAINT SYSTEM

[75] Inventors: Eiji Yanagi, Yokohama; Hiroaki Fujii, Hikoke; Kenji Kitazawa, Hikone, all of Japan

[73] Assignee: Takata Corporation, Tokyo, Japan

[21] Appl. No.: 709,536

[22] Filed: Sep. 6, 1996

[30]   Foreign Application Priority Data

Sep. 8, 1995  [JP]  Japan ............................ 7-231432
Mar. 15, 1996 [JP]  Japan ............................ 8-059163

[51] Int. Cl.$^6$ ............................................. B60R 21/16
[52] U.S. Cl. ................... 280/806; 280/807; 280/735; 297/480; 701/45; 180/282
[58] Field of Search ......................... 280/806, 807, 280/735; 297/480, 474; 701/45; 180/286, 282, 271, 274; 351/10.1

[56]    References Cited

U.S. PATENT DOCUMENTS

| | | | |
|---|---|---|---|
| 4,478,433 | 10/1984 | Taguchi et al. | 280/807 |
| 4,569,536 | 2/1986 | Tsuge et al. | 280/807 |
| 4,579,294 | 4/1986 | Sakakibara et al. | 280/806 X |
| 4,678,134 | 7/1987 | Ameur | 280/806 X |
| 5,127,671 | 7/1992 | Yano et al. | 280/806 |
| 5,202,831 | 4/1993 | Blackburn et al. | 701/45 |
| 5,552,986 | 9/1996 | Omura et al. | 701/45 |
| 5,605,102 | 2/1997 | Dixon | 180/268 |
| 5,667,246 | 9/1997 | Miller, III | 280/806 |

*Primary Examiner*—Christopher P. Ellis
*Attorney, Agent, or Firm*—Foley & Lardner

[57]    ABSTRACT

A seat belt retractor is controlled in consideration of the condition of a vehicle relative to an object and/or the condition of the vehicle to more efficiently and conformably protect the occupant in an emergency. A CPU judges the condition of the vehicle relative to the object based on a detection signal, with regard to the object in front of the vehicle, from a front object detection sensor and drives an electric motor depending on the result of the judgment. The rotation of the electric motor causes a drive side gear clutch, a clutch plate, and a lever member to rotate together. As the rotation of the lever member is stopped, the drive side gear clutch and the clutch plate rotate conversely each other so that the clutch plate shifts axially to engage the teeth thereof with teeth of the driven side gear clutch. As a result, the rotation of the electric motor causes the gear holder and the reel shaft to rotate. In this way, the belt tension of the seat belt is controlled corresponding to the condition of the vehicle relative to the object.

14 Claims, 19 Drawing Sheets

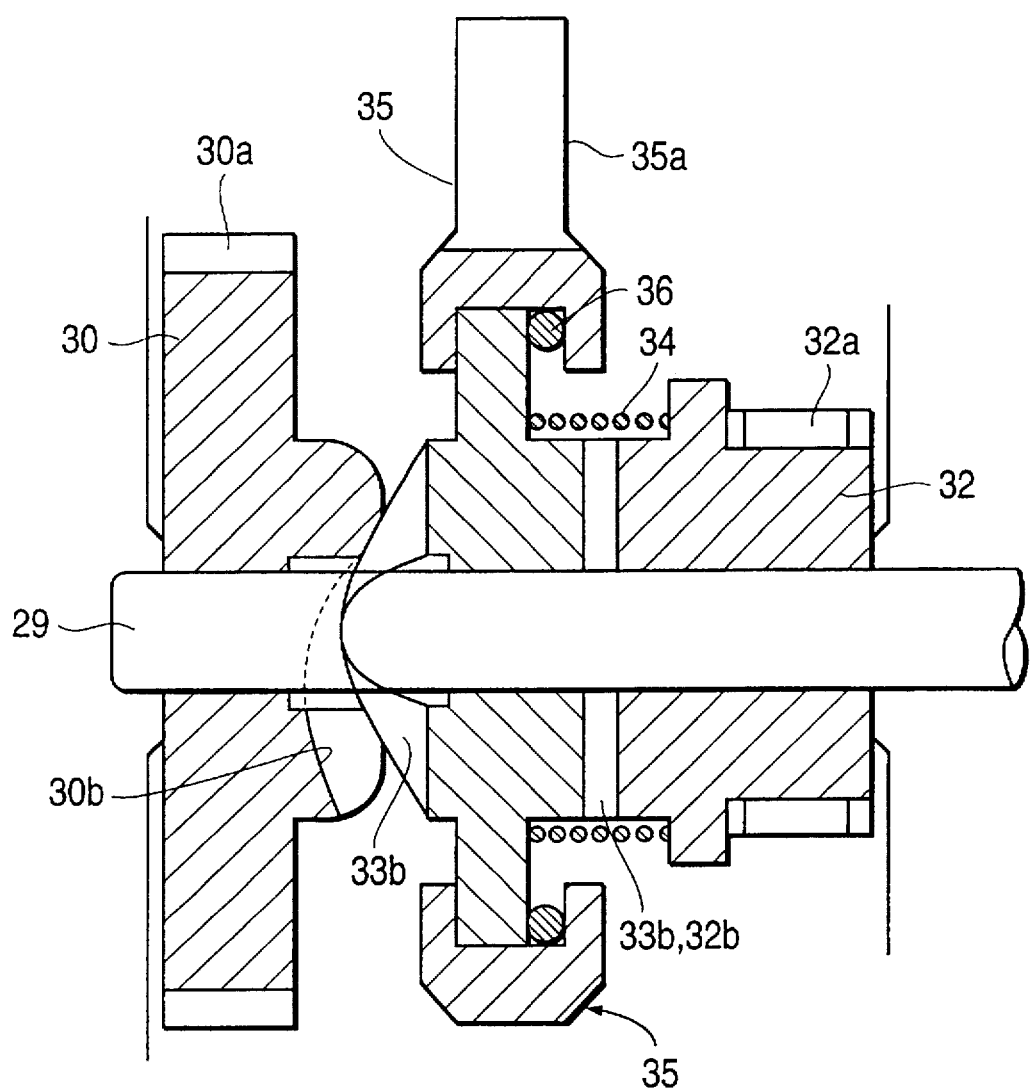

FIG. 12

| BELT WINDING FORCE | MODE | SYSTEM ACTION | ACTION REQUIREMENT |
|---|---|---|---|
| 0 | COMFORT | REMOVING BELT TENSION | 1. NO OBJECT DETECTED.<br>2. OBJECT NOT APPROACHING, OR<br>3. OBJECT APPROACHING, BUT AMPLE TIME LEFT FOR AN OCCUPANT TO AVOID, OR AVOIDING ACTION (DECELERATION) ALREADY TAKEN, AND RELATIVE SPEED ≦ 0, OR NO OTHER MODES ARE SET<br>ACTION STARTS 3-5 SECONDS AFTER ANY OF CONDITIONS ABOVE IS MET |
| 0.5 | PRECAU-TIONARY | WINDING FORCE APPLIED ONLY FROM TENSION PROVIDER | 1. BELT BEING FASTENED OR RELEASED, OR<br>2. VEHICLE SPEED EQUALS TO OR MORE THAN A PRESET SPEED (e.g. 10-20 km/h), OBJECTS APPROACHING, AND NO TIME FOR AN OCCUPANT TO AVOID, AND<br>  (i) IN CASE OF FOLLOWING ANOTHER VEHICLE, AND RELATIVE DISTANCE ≦ SAFE DISTANCE, OR<br>  (ii) IN CASE OF STATIONARY OBJECT OR ONCOMING VEHICLE, AND RELATIVE DISTANCE ≦ SAFE DISTANCE TO THE OBJECT OR THE ONCOMING VEHICLE.<br>UNDER FIRST PRESET MARGIN DISTANCE (e.g. 5m) |
| 3 | WARNING | ALARM, LAMP AND FIRST PRESET BELT TENSION (e.g. 2-3 kgf) | 1. VEHICLE SPEED EQUALS TO OR MORE THAN A SET SPEED RANGE (e.g. 10-20 km/h), OBJECTS APPROACHING, AND COLLISION POSSIBLE IF OCCUPANT MANUALLY CONTROLS VEHICLE SAME AS PRECAUTIONARY MODE, UNDER SECOND PRESET MARGIN DISTANCE (e.g. 2m) |
| 5 | EMER-GENCY | ALARM, LAMP AND SECOND PRESET BELT TENSION (e.g. MORE THAN 5 kgf) | 1. VEHICLE SPEED MORE THAN A SET SPEED RANGE (e.g. 10-20 km/h), COLLISION UNAVOIDABLE IF OCCUPANT MANUALLY CONTROLS VEHICLE, AND RELATIVE DISTANCE ≦ SYSTEM ACTION COMPLETION TIME (CONVERTED INTO DISTANCE). |

FIG. 17

| BELT WINDING FORCE | MODE | SYSTEM ACTION | ACTION REQUIREMENT |
|---|---|---|---|
| 0 | COMFORT | REMOVING BELT TENSION | 1. NO OBJECT DETECTED.<br>2. OBJECT NOT APPROACHING, OR<br>3. OBJECT APPROACHING, BUT AMPLE TIME LEFT FOR AN OCCUPANT TO AVOID, OR AVOIDING ACTION (ACCELERATION) ALREADY TAKEN, AND RELATIVE SPEED ≧ 0, OR NO OTHER MODES ARE SET<br><br>ACTION STARTS 3-5 SECONDS AFTER ANY OF CONDITIONS ABOVE IS MET |
| 0.5 | PRECAU-TIONARY | WINDING FORCE APPLIED ONLY FROM TENSION PROVIDER | 1. BELT BEING FASTENED OR RELEASED, OR<br>2. VEHICLE SPEED EQUALS TO OR LESS THAN A PRESET SPEED (e.g. 10-20 km/h), OBJECTS APPROACHING, AND NO TIME FOR AN OCCUPANT TO AVOID, AND<br>(i) IN CASE OF FOLLOWING ANOTHER VEHICLE, AND RELATIVE DISTANCE ≧ SAFE DISTANCE, OR<br>(ii) IN CASE OF STATIONARY OBJECT OR ONCOMING VEHICLE, RELATIVE DISTANCE ≧ SAFE DISTANCE TO THE OBJECT OR THE ONCOMING VEHICLE.<br><br>UNDER FIRST PRESET MARGIN DISTANCE (e.g. 5m) |
| 3 | WARNING | ALARM, LAMP AND FIRST PRESET BELT TENSION (e.g. 2-3 kgf) | 1. VEHICLE SPEED EQUALS TO OR LESS THAN A SET SPEED RANGE (e.g. 10-20 km/h), OBJECTS APPROACHING, AND COLLISION POSSIBLE IF OCCUPANT MANUALLY CONTROLS VEHICLE SAME AS PRECAUTIONARY MODE, UNDER SECOND PRESET MARGIN DISTANCE (e.g. 2m) |
| 5 | EMER-GENCY | ALARM, LAMP AND SECOND PRESET BELT TENSION (e.g. MORE THAN 5 kgf) | 1. VEHICLE SPEED LESS THAN A SET SPEED RANGE (e.g. 10-20 km/h), COLLISION UNAVOIDABLE IF OCCUPANT MANUALLY CONTROLS VEHICLE, AND RELATIVE DISTANCE ≦ SYSTEM ACTION COMPLETION TIME (CONVERTED INTO DISTANCE). |

VEHICLE OCCUPANT RESTRAINT SYSTEM

BACKGROUND OF THE INVENTION

DETAILED DESCRIPTION OF THE PREFERRED EMBODIMENTS

The present invention relates to an occupant restraint system using a seat belt to protect an occupant, installed in a vehicle such as a passenger vehicle and, more particularly, to an occupant restraint system which securely restrains and protects an occupant by detecting an object in proximity to the vehicle in front, rear, left and right sides, or the driving condition of the vehicle, such as rolling over, emergency braking, or sharp turning, and adjusting the belt tension depending on the condition of the vehicle relative to the object or the condition of the vehicle.

A seat belt device conventionally equipped in a vehicle protects an occupant by restraining and preventing an occupant from being thrown out from a vehicle seat in an emergency, such as when the vehicle is significantly decelerated upon impact.

Such a seat belt device is equipped with a seat belt retractor that winds up a seat belt. The seat belt retractor has a tension provider, such as a spiral spring, constantly biasing a reel shaft to wind up the seat belt in the direction of winding up the belt. Due to the biasing force by the tension provider, the seat belt is always wound on the reel shaft when it is not in use. When worn by an occupant, the seat belt is pulled out against the biasing force of the tension provider, and retrains the occupant. In this case, the biasing force of the tension provider is set to be small so that the occupant will not feel constrained and permitting the belt to be pulled out easily to allow the occupant to move comfortably.

The seat belt retractor is also provided with a lock to prevent the reel shaft from unwinding the seat belt in emergency as mentioned above. Thus, the lock activates at the time of emergency to prevent the seat belt from being unwound, thereby securely restraining and protecting the occupant.

Such conventional seat belt devices have a substantially constant belt tension applied to the seat belt while in use, by the force of the tension provider. The seat belt retractor thus operates in the same manner regardless of the condition of the vehicle relative to the nearby object, or of the driving condition of the vehicle, such as rolling over, emergency braking, or sharp turning. Therefore, the conventional seat belt device securely restrains and protects the occupant in an emergency as mentioned previously; however, a more comfortable seat belt device is desired during normal driving conditions.

SUMMARY OF THE INVENTION

What is sought here is improved efficiency of occupant protection and comfort by controlling the seat belt retractor, with consideration given to the condition of the vehicle relative to nearby objects and/or to the driving condition of the vehicle.

The present invention was devised considering such situations, and an object of the present invention is to provide an occupant restraint system which is able to protect an occupant more efficiently and conformably by controlling the seat belt retractor in consideration of the condition of the vehicle relative to a nearby object and/or to the driving condition of the vehicle.

For solving the problems of the prior art as mentioned above, the invention relates to a vehicle occupant restraint system for protecting an occupant by preventing the unwinding of a seat belt when necessary, using a seat belt retractor comprising a reel shaft on which the seat belt is wound up, a frame supporting both ends of the reel shaft in such a manner that the shaft can rotate freely, and a lock located between the frame and the reel shaft which permits the reel shaft to rotate in normal conditions but prevents the reel shaft from rotating to unwind the seat belt when necessary. The occupant restraint may comprise a belt tension control mechanism controlling the rotation of the reel shaft; an object detector for detecting an object in proximity to the vehicle; and a central processing unit for determining the condition of the vehicle relative to the objects based on a detection signal from the object detector and controlling the belt tension control mechanism based on a result of the determination, to control the belt tension of the seat belt to a predetermined tension depending on the condition of the vehicle relative to the object.

Another aspect of the invention relates to a vehicle occupant restraint system having an object detector, which is any one of a front object detector, a side object detector capable of detecting objects on at least one side of the vehicle and a rear object detector.

Yet another aspect of the invention relates to a vehicle occupant restraint system that has a predetermined number of modes that are set depending the vehicle's relative position to an object. Preset values of the belt tension are set for each mode. Those modes can be, generally, a comfort mode where the preset value of the belt tension is set at 0, a precautionary mode where the preset value of the belt tension is set at a first predetermined level; and a warning mode where the preset value of the belt tension is set at a second predetermined level greater than the first predetermined level.

Those modes can also be four modes, namely, a comfort mode where the preset value of the belt tension is set at approximately 0, a precautionary mode where the preset value of the belt tension is set at a first predetermined level, a warning mode where the preset value of the belt tension is set at a second predetermined level greater than the first predetermined level, and an emergency mode where the preset value of the belt tension is set at a third predetermined level greater than the second predetermined level.

The vehicle restraint system can further comprise a vehicle condition detector which detects any of the conditions of the vehicle, whether the vehicle is rolling over, a brake of the vehicle is pressed hard, or the vehicle is turning sharply. In this case, the central processing unit determines the condition of the vehicle relative to the object based on the detection signal from the object detector and controls the tension of the seat belt to a predetermined tension based on the result of the determination.

The vehicle occupant restraint system can also protect an occupant by preventing the unwinding of a seat belt when necessary, using a seat belt retractor comprising a reel shaft on which the seat belt is wound up, a frame supporting both ends of the reel shaft in such a manner that the shaft can rotate freely, and a lock located between the frame and the reel shaft. The lock permits the reel shaft to rotate in normal conditions but prevents the reel shaft from rotating to unwind the seat belt when necessary. The occupant restraint system can further comprise: a belt tension control mechanism controlling the rotation of the reel shaft, a vehicle condition detector to detect the conditions of a vehicle whether the vehicle is rolling over, a brake of the vehicle is pressed hard, or is turning sharply, and a central processing unit which determines the condition of the vehicle based on a detection signal from the vehicle condition detector and controls the belt tension control mechanism based on a result of the determination, to control the belt tension of the seat belt to a predetermined tension corresponding to the condition of the vehicle. The number of modes can be set depending on the condition of the vehicle, and preset values of the belt tension. The number of the modes can be three, namely, a comfort mode where the preset value of the belt tension is set at 0, a precautionary mode where the preset value of the belt tension is set at a first predetermined level and a warning mode where the preset value of the belt tension is set at a second predetermined level. The number of the modes can be four, namely, a comfort mode where the preset value of the belt tension is set at 0, a precautionary mode where the preset value of the belt tension is set at a first predetermined level, a warning mode where the preset value of the belt tension is set at a second predetermined level greater than the first predetermined level, and an emergency mode where the preset value of the belt tension is set at a third predetermined level greater than the second predetermined level.

The belt tension control mechanism can comprise a motor controlled by the central processing unit and a gear transferring mechanism for transferring the driving force of the motor to the reel shaft.

The motor of the belt tension control mechanism can be a DC motor, a stepping motor or an ultrasonic motor, which is controlled by the central processing unit to stop rotating thereby preventing the rotation of the reel shaft when the electricity is off even when the reel shaft is applied with a rotational force lower than a predetermined value, and to rotate the reel shaft when the electricity is on.

In a vehicle occupant restraint system according to the present invention as structured above, the object detector detects an object in proximity to the vehicle, and outputs an object detection signal to the central processing unit. The central processing unit, based on the signal, for example, calculates the relative speed and the relative distance of the vehicle to the object, and the safe distance therebetween. The central processing unit can further judge whether the object is stationary or moving, whether the object is a following vehicle or an oncoming vehicle; if the object is moving, whether the vehicle will collide with the object, whether the collision can be avoided based on the acquired data. The central processing unit, based on this judgment, can activate the belt tension control mechanism. Thus, the tension of the seat belt is set to the predetermined level depending on the condition of the vehicle relative to the object.

Therefore, the seat belt retractor can be controlled in consideration of the condition of the vehicle relative to the object, and restrain and protect an occupant in case of an emergency effectively, while providing more comfort to the occupant at other times.

In the vehicle occupant restraint system of the present invention, the vehicle condition detector detects the condition of the vehicle whether the vehicle is rolling over, a brake of the vehicle is pressed hard, or the vehicle is turning sharply, and outputs a vehicle condition detection signal to the central processing unit. The central processing unit judges the condition of the vehicle based on this signal, and activates the belt tension control mechanism based on this judgment. Thus, the belt tension control mechanism operates as mentioned above, and rotates the reel shaft, thereby controlling the belt tension of the seat belt to the predetermined level depending on the condition of the vehicle.

Further, in the vehicle occupant restraint system of the present invention, the object detector inputs the object detection signal, and the vehicle condition detector outputs the vehicle condition detection signal to the central processing unit. Thus, the belt tension control mechanism operates as mentioned above, and rotates the reel shaft, thereby controlling the tension of the seat belt to the predetermined level depending on the condition of the vehicle relative to the object or the condition of the vehicle generally.

Therefore, the seat belt retractor can be controlled in consideration of the condition of the vehicle relative to nearby objects and the condition of the vehicle generally, and further efficiently restrains and protects an occupant in case of emergency, while providing more comfort to the occupant at other times.

Particularly, the predetermined modes can be set, depending on the condition of the vehicle relative to the object. Also, the predetermined modes can be set depending on the condition of the vehicle relative to the object. As the preset belt tension level can be set for each mode, the occupant in case of an emergency is restrained and protected safely but simply.

BRIEF DESCRIPTION OF THE DRAWINGS

FIG. 11A shows a plan view of the belt tension control mechanism and FIG. 11B shows a sectional view, corresponding to FIG. 6, in which the teeth of the driven side gear and the teeth of the clutch plate are engaged, schematically showing another part of the belt tension control mechanism in operation;

FIG. 12 shows a view for explaining the modes for the occupant restraint system;

FIG. 17 shows a view for explaining the modes for the occupant restraint system relative to an object behind the vehicle;

DETAILED DESCRIPTION OF PREFERRED EMBODIMENTS

Hereinafter, embodiments will be described with reference to the drawings.

Figure 1:
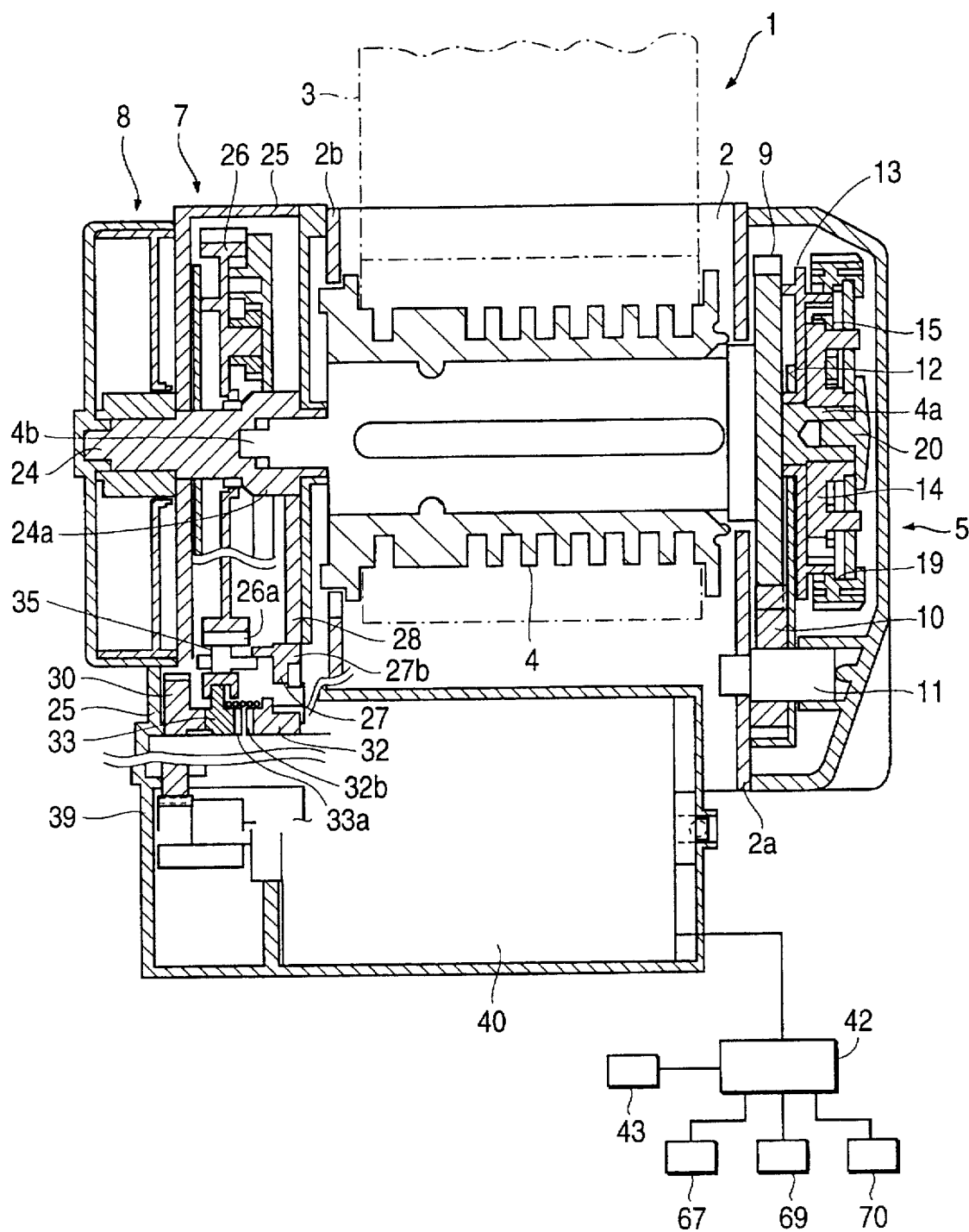
FIG. 1 shows a cross-sectional view of one example of the seat belt retractor used in the first embodiment of the occupant restraint system of the present invention.
Figure 2:
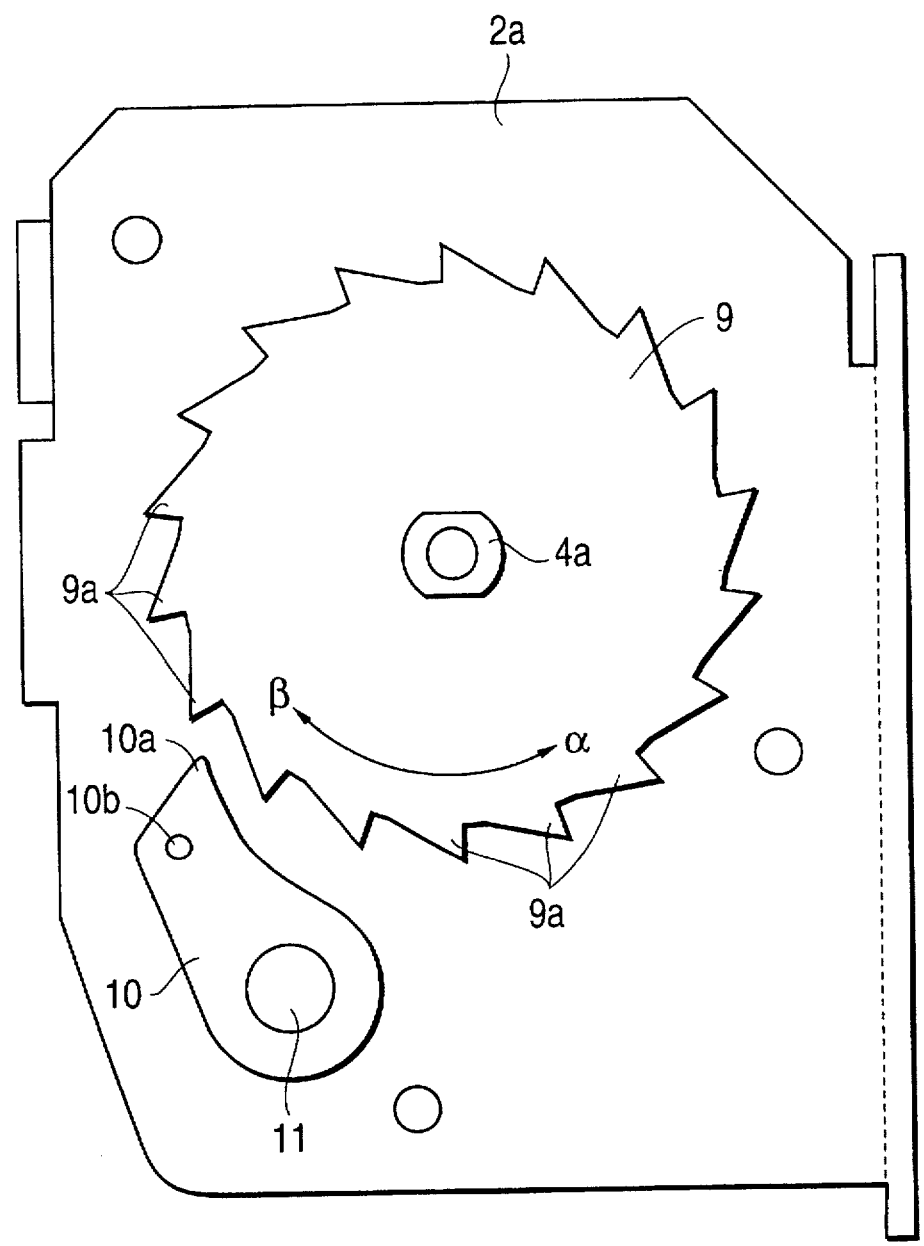
FIG. 2 shows a right side view of the FIG. 1 before the seat belt lock is assembled.
Figure 3:
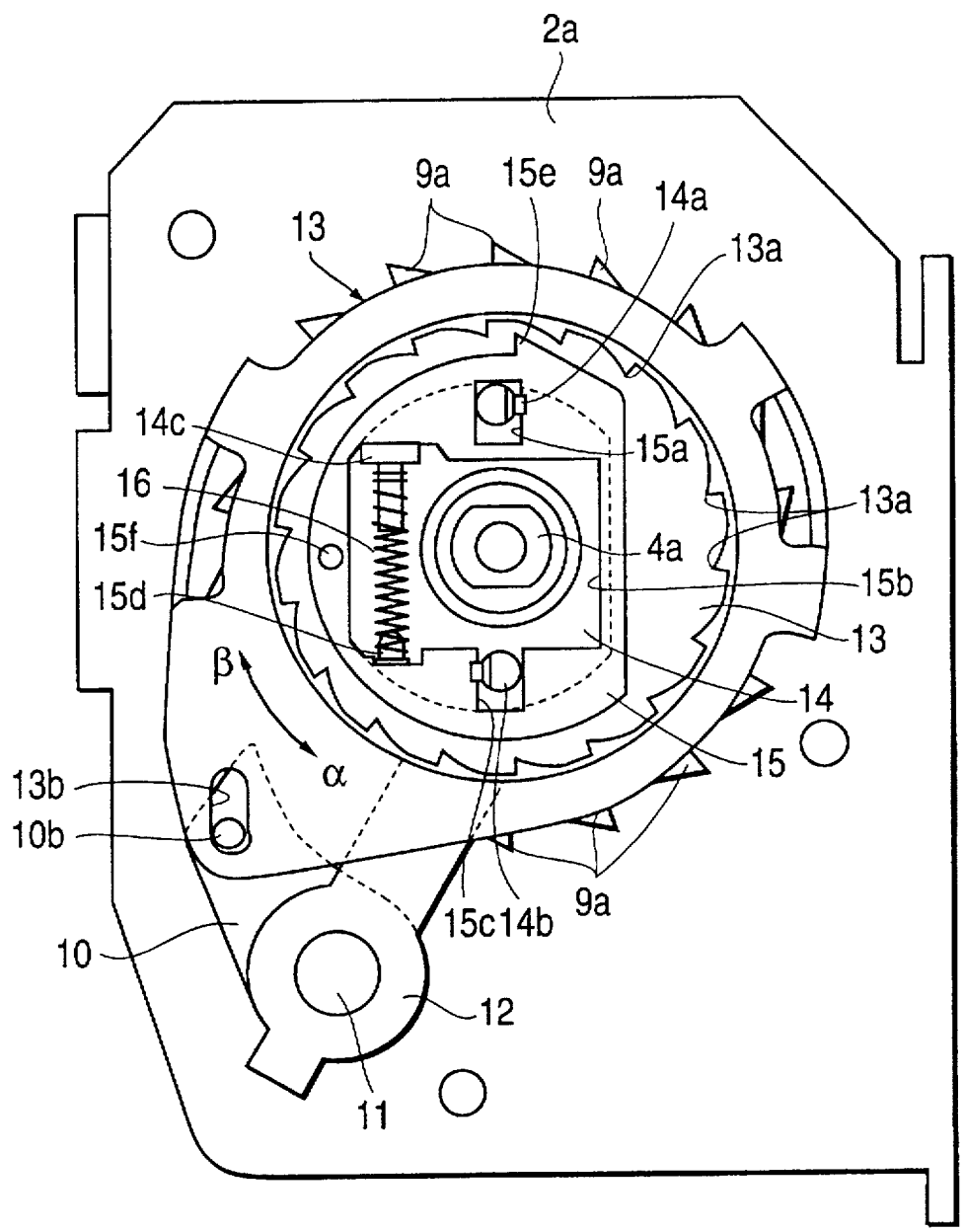
FIG. 3 shows a right side view of FIG. 1 after some elements of the seat belt lock have been assembled.
Figure 4:
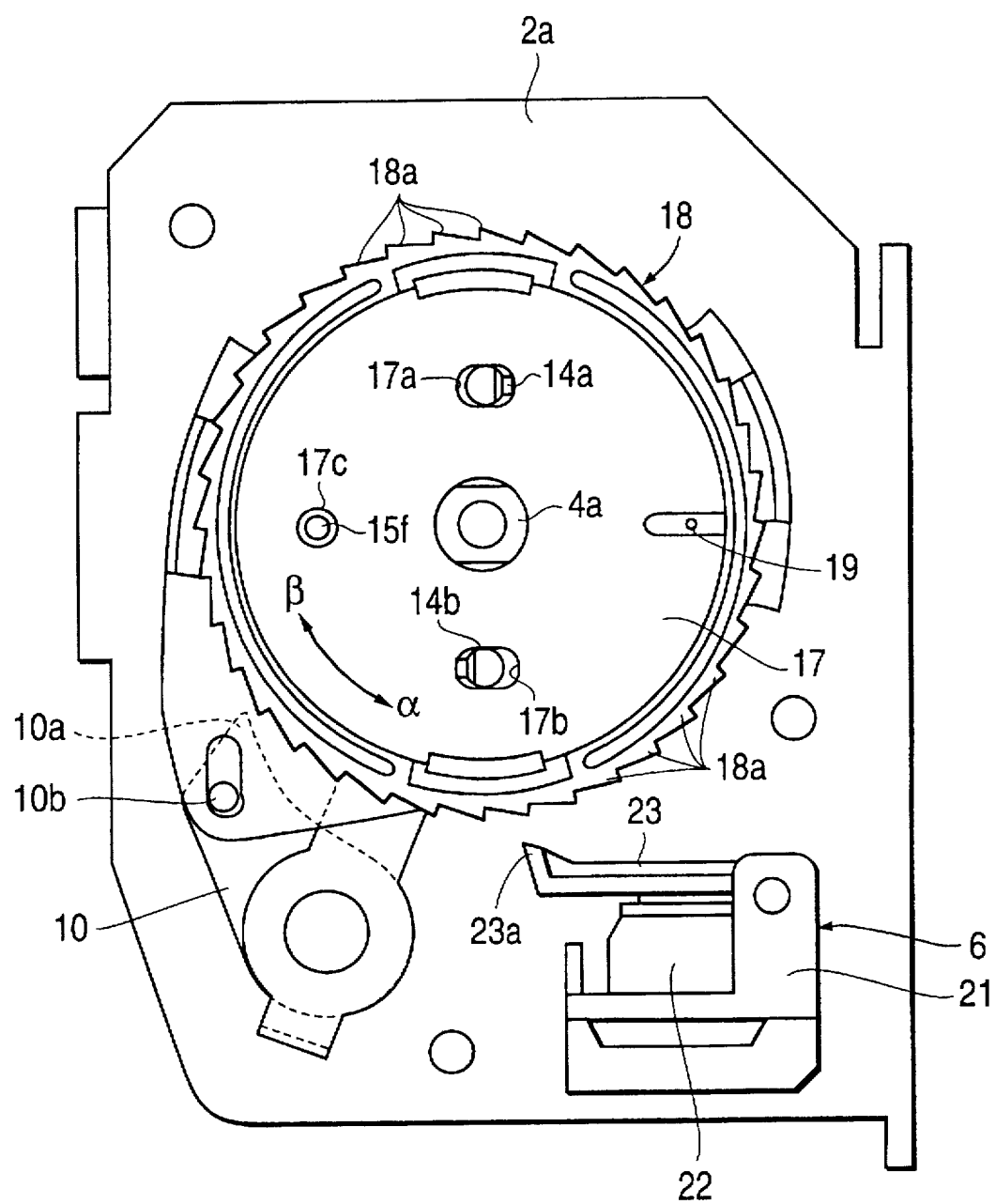
FIG. 4 shows a right side view of FIG. 1 in which some other elements and a deceleration sensor are assembled, in addition to the seat belt lock.
Figure 5:
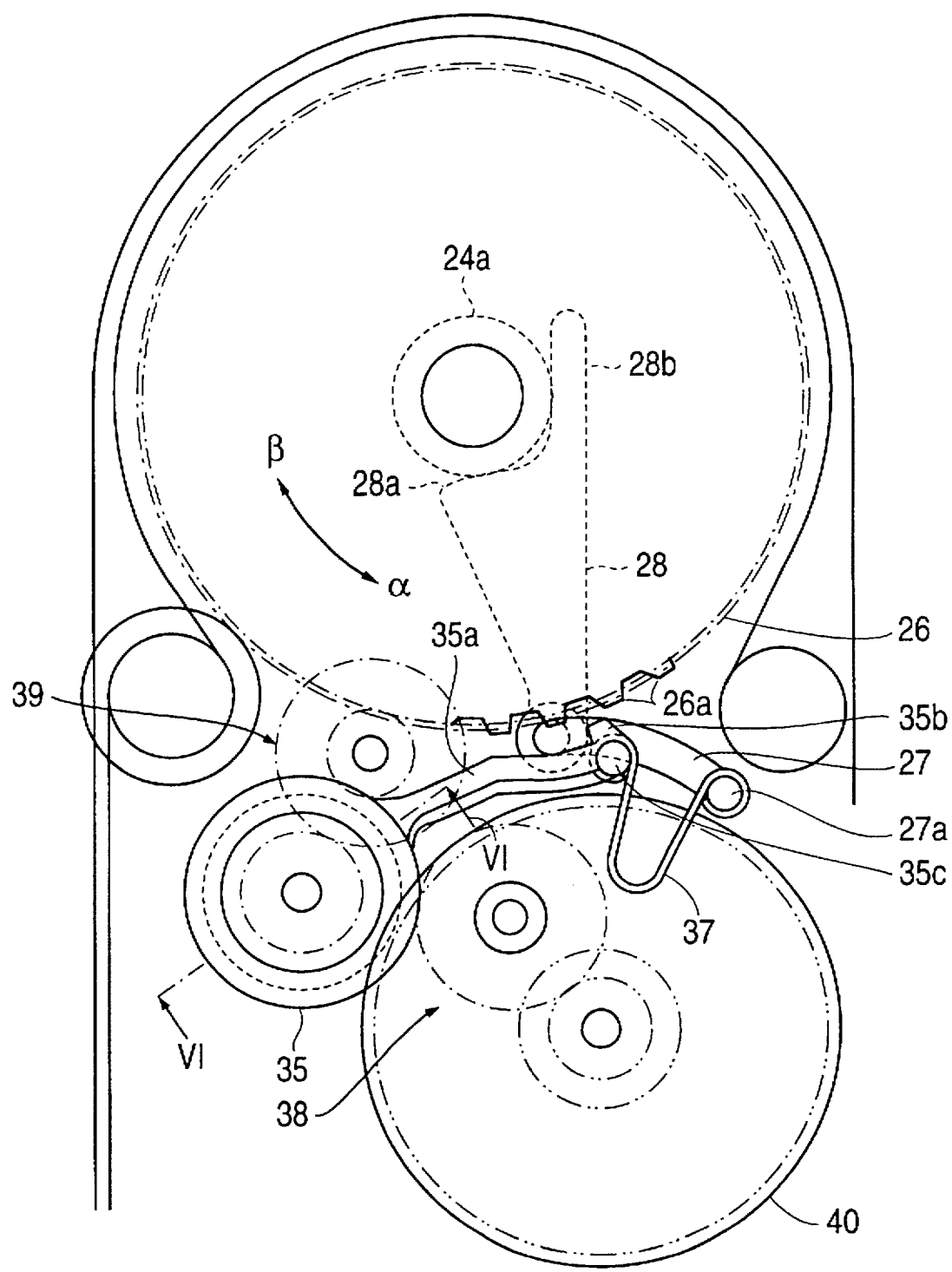
FIG. 5 shows a left side view of FIG. 1.

FIG. 1 is a cross-sectional view of one example of a seat belt retractor used in a first embodiment of an occupant restraint system of the present invention; FIG. 2 is a right side view of the FIG. 1 before a seat belt lock is assembled; FIG. 3 is a right side view of FIG. 1 after some elements of the seat belt lock have been assembled; FIG. 4 is a right side view of FIG. 1 where some other elements and a deceleration sensor are assembled, in addition to the seat belt lock; and FIG. 5 is a left side view of FIG. 1.

As shown in FIG. 1, the seat belt retractor 1 has a U-shaped frame 2 having a right wall 2a and a left wall 2b. A reel shaft 4 for winding up a seat belt 3 is located between the right and left walls 2a and 2b of the frame 2. A seat belt lock 5 and a deceleration sensor 6 (shown in FIG. 4) are fixed to the right wall 2a. When the deceleration sensor 6 detects the deceleration of the vehicle, it activates the seat belt locking mechanism 5. Further, a belt tension control mechanism 7 and a tension provider 8 for providing tension force to the real shaft 4 to wind up the seat belt 3 are fixed to the left wall 2b.

As shown in FIGS. 1 and 2, the reel shaft 4 has a ratchet wheel 9 on its right end. The ratchet wheel 9 is located outside the right wall 2a. The right wall 2a is provided with a pawl 10 which is pivotally mounted by a pin 11 on a lower left portion thereof. The pawl 10 has an engaging portion 10a integrally at the tip thereof, in such a shape that it can engage or release one of external teeth 9a of the ratchet wheel 9. A predetermined number of the external teeth 9a are arranged around the ratchet wheel 9, one surface of which faces the direction α of unwinding the seat belt 3 (hereinafter, referred to as the seat belt unwinding direction β) has a relatively gradual slope, and the other surface of which faces the direction β of winding the seat belt 3 (hereinafter, referred to as the seat belt winding direction β) is set formed approximately perpendicularly. In addition, the pawl 10 is provided with a protruded cam follower 10b near the tip thereof. The ratchet wheel 9 and the pawl 10 constitute a lock mechanism 5 of the present invention.

As shown in FIGS. 1 and 3, there is a tie plate 12 to support the pin 11, and the tie plate 12 is also fitted with the right end 4a of the reel shaft 4 at the further right of the ratchet wheel 9.

A seat belt locking mechanism 5 is also well-known in the art as shown in FIGS. 1, 3, and 4, and comprises a lock ring 13 rotatably mounted to the right end 4a of the reel shaft 4; a retainer 14 fixed to the right end 4a; a carrier 15 engaged to the retainer 14 in a such way that it can slide only in one of directions tangential to the retainer 14 (i.e. a vertical direction in FIG. 3); a spiral spring 16 which is compressed between the retainer 14 and the carrier 15; a disk member 17 supported in a manner that it can rotate relative to the shaft portion of the retainer 14; a ring member 18 installed around the disk member 17 in a manner that it can rotate relative to the disk member 17, and a ring-like spring 19 disposed between the disk member 17 and the ring member 18.

The lock ring 13 is provided with a predetermined number of internal teeth 13a, 13a, . . . formed around the inner periphery thereof. One surface of the internal teeth 13a facing the seat belt unwinding direction α is set formed approximately perpendicularly and the other surface facing the seat belt winding direction β has a relatively gradual slope. The lock ring 13 is provided with a cam hole 13b through which the cam follower 10b of the pawl 10 are inserted. Thus, when the lock ring 13 rotates in the seat belt unwinding direction β, the cam follower 10b, guided by the cam hole 13b, shifts from one end of the cam hole 13b, as shown in FIG. 3, to the other end. As a result, the pawl 10 rotates and moves the engaging portion 10a from a non-engaging position where the engaging portion 10a is located apart from the external teeth 9a of the ratchet wheel 9 to an engaging position where one of the teeth 9 will engage and be locked by the engaging portion 10a.

The retainer 14 is provided with guide pins 14a, 14b and a spring receiver 14c which supports one end of the spiral spring 16 which project from the surface thereof.

The carrier 15 is provided with: a hole 15a cut in a radial direction; a relatively large opening 15b in the center; a slot 15c cut in a axial direction and positioned on the same diameter of the opening 15b; a spring receiver 15d which supports the other end of the spring coil 16; an engaging protuberance 15e formed on the periphery of the carrier 15 which is able to engage with one of internal teeth 13a of the lock ring 13; and a protruding pin 15f. The guide 14a is inserted through the hole 15a and the guide 14b is inserted through the slot 15c. The guides 14a and 14b introduce the carrier 15 so that the carrier 15 slides itself only in one of directions tangential to the retainer 14 and the lock ring 13 (i.e. the vertical direction in FIG. 3). The carrier 15 is usually kept at a non-engaging position where the engaging protuberance 15e is free from the internal teeth 13a due to the spring force of the spiral spring 16, and moves to an engaging position where the engaging protuberance 15e engages and stops the internal teeth 13a when the carrier 15 shifts relative to the lock ring 13.

The disk member 17 has elongated holes 17a and 17b parallel to its circumference, through which the guides 14a and 14b are inserted, and a round hole 17c through which the pin 15f is inserted.

The ring member 18 is provided with a predetermined number of external teeth 18a, 18a, . . . around the periphery thereof, one surface of which faces the seat belt unwinding direction a has a relatively gradual slopes, and the other surface faces the seat belt winding direction β is shaped approximately perpendicularly.

The disk member 17 and the ring member 18 normally rotate as an integral unit because of the ring-like spring 19, but move relative to each other when a moment greater than a specific magnitude is applied to them in opposing directions. The disk member 17 and the ring member 18 constitute an inertial member.

Each member constituting the seat belt lock 5 is prevented from slipping out by a cap 20 fitted on the right end 4a.

The deceleration sensor 6 is also well known in the art. As shown in FIG. 4, the deceleration sensor 6 comprises a case unit 21 to be attached to the right wall 2a, an inertial member 22 which tilts forward (left side in FIG. 4) when the vehicle slows down, and an engaging lever 23 pivotally accommodated in the case unit 21. The engaging lever 23 is provided with an engaging part 23a, capable of engaging with one of the external teeth 18a of the ring member 18, at the tip thereof. As illustrated in FIG. 4, the inertial member 22 remains upright and the engaging lever 23 is held at a non-engaging position, with the engaging part 23a away from the external teeth 18a under normal conditions. When the vehicle is decelerated at a rate exceeding a predetermined rate, the engaging lever 23, the inertial member tilting forward so that the engaging lever 23 pivots towards the ring member 18, thereby positioning the engaging part 23a to the engaging position to engage and stop the external teeth 18a.

As shown in FIG. 1, the drive shaft 24 is engaged with a left end 4b of the reel shaft 4 using a spline type connector and thus rotates together with the reel shaft 4 as an integral unit.

Figure 6:
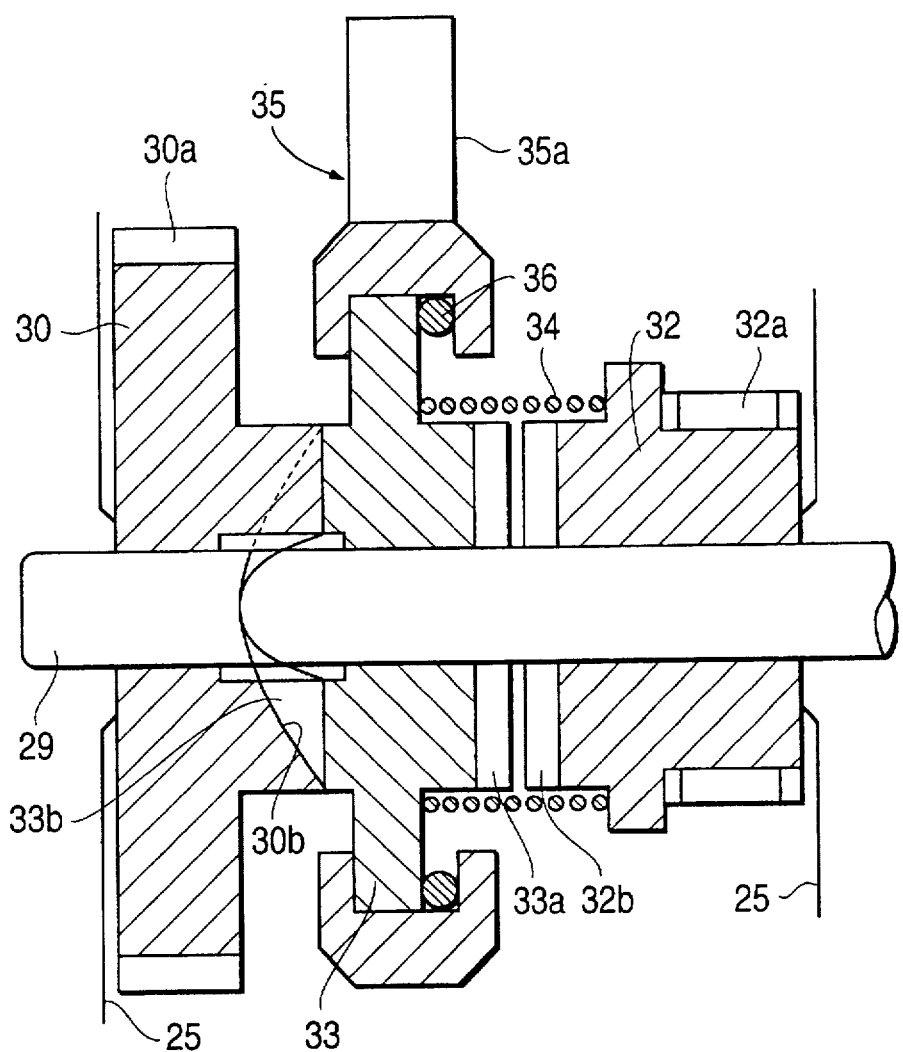
FIG. 6 shows a sectional view taken along line VI—VI in which the teeth of the driven side gear and the teeth of the clutch plate are not engaged.

As shown in FIGS. 1, 5, and 6, the belt tension control mechanism 7 comprises: a casing 25 to be attached to the left wall 2b; a gear holder 26 having a predetermined number of engaging teeth 26a, 26a, ... on its outer surface and fixed to the drive shaft 24 inside the casing 25; a friction lever 27 is fixed to the casing 25 in such a way that the friction lever 27 is capable of pivoting around a pivotal axis 27a as one end of the friction lever 27; a friction plate 28 is pivotally fixed to a support shaft 27b as the other end of the friction lever 27; a rotation shaft 29 rotatably supported by the casing 25; a drive side gear clutch 30 supported by the rotation shaft 29 in such a way that it is able to slide in the axial direction of and unable to rotate relative to the rotation shaft 29; a driven side gear clutch 32 supported by the rotation shaft 29 not to rotate relative to the rotation shaft 29; a clutch plate 33 also supported by the rotation shaft 29 in such a way that it is able to slide in the axial direction of and unable to rotate relative to the rotation shaft 29; a clutch spring 34 compressed between the driven side gear clutch 32 and the clutch plate 33; a lever member 35 supported around the surface of the clutch plate 33 in such a manner that it is able to rotate relative to the clutch plate 33; a ring-shaped spring clutch 36 set between the clutch plate 33 and the lever member 35; a U-shaped spring 37 between the lever member 35 and the friction lever 27; a first gear transfer mechanism 38 connecting an electric motor 40 to be mentioned later and the drive side gear clutch 30; a second gear transfer mechanism 39 connecting the driven side gear clutch 32 and the gear holder 26; and the electric motor 40.

Figure 9A:
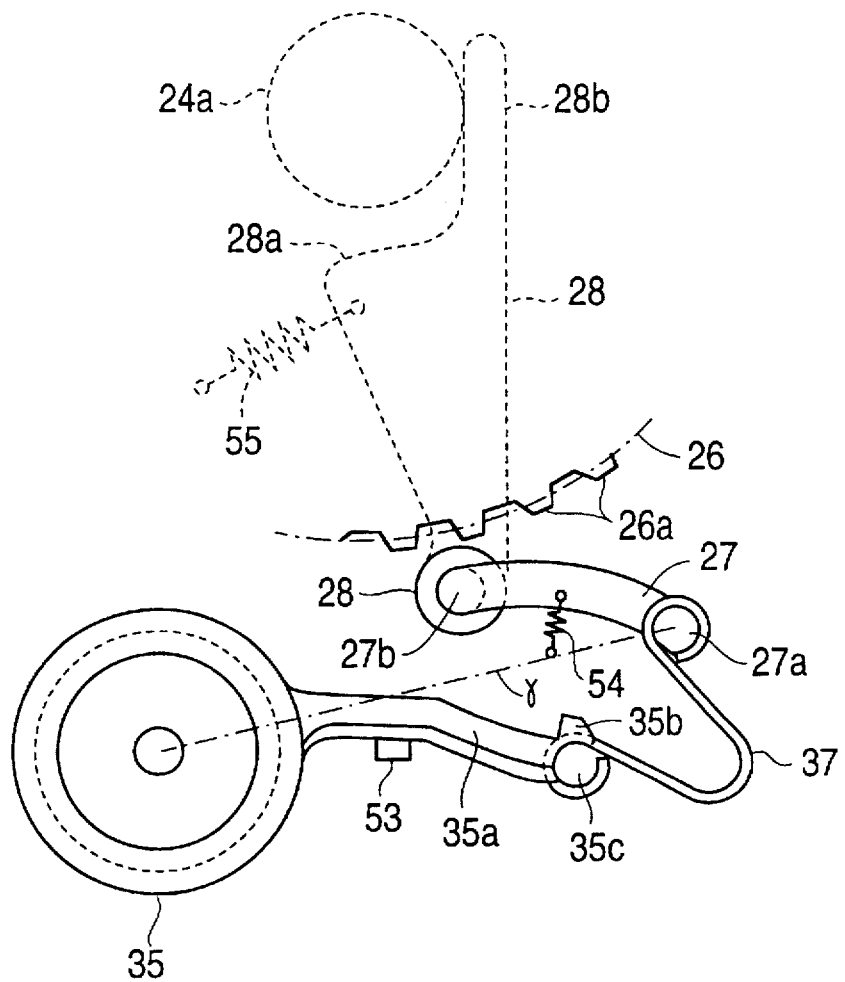
FIG. 9A shows a plan view of the belt tension control mechanism and FIG. 9B shows a sectional view, corresponding to FIG. 6, in which the teeth of the driven side gear and the teeth of the clutch plate are engaged, schematically showing the belt tension control mechanism in non operation.

As illustrated in FIG. 9A to be described later, a return spring 54 is compressed between the friction lever 27 and the casing 25. Therefore, the friction lever 27 is always biased in counter-clockwise direction in FIG. 9A due to the small spring force of the return spring 54.

As shown in FIG. 5, the friction plate 28 is roughly formed in a fan-shape, one end of which has an arc portion 28a and a radial projection 28b. The arc portion 28a and one side of the projection 28b can become in contact with a larger circumference 24a of the drive shaft 24. FIG. 9A shows a return spring 55 compressed between the friction plate 28 and the casing 25. Therefore, the friction plate 28 is always biased in counter-clockwise direction in FIG. 9A due to the small spring force the return spring 55. Thus, one side of the radial projection 28b, under normal conditions, is held in contact with the larger circumference 24a. The larger circumference 24a of the drive shaft 24 and the friction plate 28 constitute the belt tension detector. The friction plate 28 is constantly given a small downward force by the return spring 54 through the friction lever 27 in FIG. 9A.

As detailed in FIG. 6, the drive side gear clutch 30 is provided with a predetermined number of teeth 30a around the outer periphery thereof, and these teeth 30a are engaged with the teeth of the last toothed wheel of the first gear transfer mechanism 38. In this way, the driving force of the electric motor 40 is transferred to the drive side gear clutch 30. The driven side gear clutch 32 is provided with a predetermined number of teeth 32a around the outer periphery thereof, and these teeth 32a are engaged with the teeth of the last toothed wheel of the second gear transfer mechanism 39. In this way, the driving force of the driven side gear clutch 32 is transferred to the gear holder 26.

Further, the driven side gear clutch 32 and the clutch plate 33 have clutch teeth 32b and clutch teeth 33a formed on the facing surfaces thereof, respectively. These clutch teeth 32b and 33a engage with each other when the clutch plate 33 shifts towards the driven side gear clutch 32, thereby transferring the driving force of the clutch plate 33 to the driven side gear clutch.

Further, the rotation shaft 29 and the drive side gear clutch 30 have a cam surface 29a and a cam surface 30b which are formed on the surfaces thereof facing the clutch plate 33, respectively, and form an eccentric cone-shaped concave. The clutch plate 33 has an arch-shaped protrusion 33b formed on a surface facing the drive side gear clutch 30. The clutch plate 33 is biased towards the drive side gear clutch 30 by the spring force of the clutch spring 34 so that the protrusion 33b is always in contact with the cam surface 30b. The cam surface 30b, as shown in FIG. 6 under normal conditions, keeps the clutch plate 33 at the farthest distance from the driven side gear clutch 32, by the force of the clutch spring 34, and keeps both the clutch teeth 32b and 33a in a non-engaged position. When the drive side gear clutch 30 rotates in the seat belt unwinding direction relative to the clutch plate 33, the cam surface 30b slides the clutch plate 33 toward the driven side gear clutch 32 to engage the clutch teeth 32b and 33a. The cam surface 30b further transfers the rotating force of the drive side gear clutch 30 in the seat belt unwinding direction to the clutch plate 33 so that the clutch plate 33 rotates in the same direction.

As shown in FIG. 5, the lever member 35 is provided with an arm 35a. The arm 35a comes in contact with the support shaft 27b of the friction lever 27, when the lever member 35 rotates in the seat belt unwinding direction. The arm 35a is provided with an engaging part 35b formed on the tip thereof in a manner that the engaging part 35b is capable of engaging one of the teeth 26a of the gear holder 26. The arm 35a is provided with a spring supporting projection 35c next to the engaging part 35b thereof. The clutch plate 33 and the lever member 35 rotate together in a normal state because of the spring clutch 36, but rotate conversely each other when angular moments opposed each other greater than a predetermined magnitude are applied to the clutch plate 33 and the lever member 35, respectively.

Figure 10A:
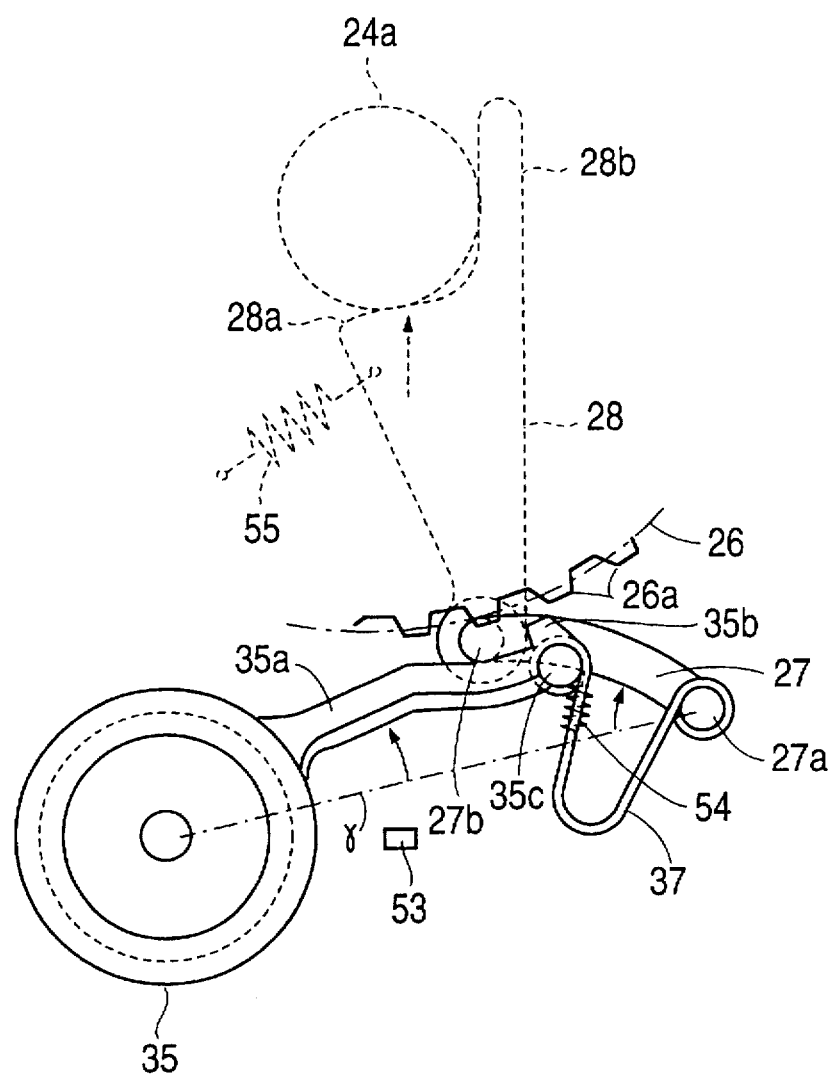
FIG. 10A shows a plan view of the belt tension control mechanism and FIG. 10B shows a sectional view, corresponding to FIG. 6, in which the teeth of the driven side gear and the teeth of the clutch plate are engaged, schematically showing a part of the belt tension control mechanism in operation.
Figure 10B:
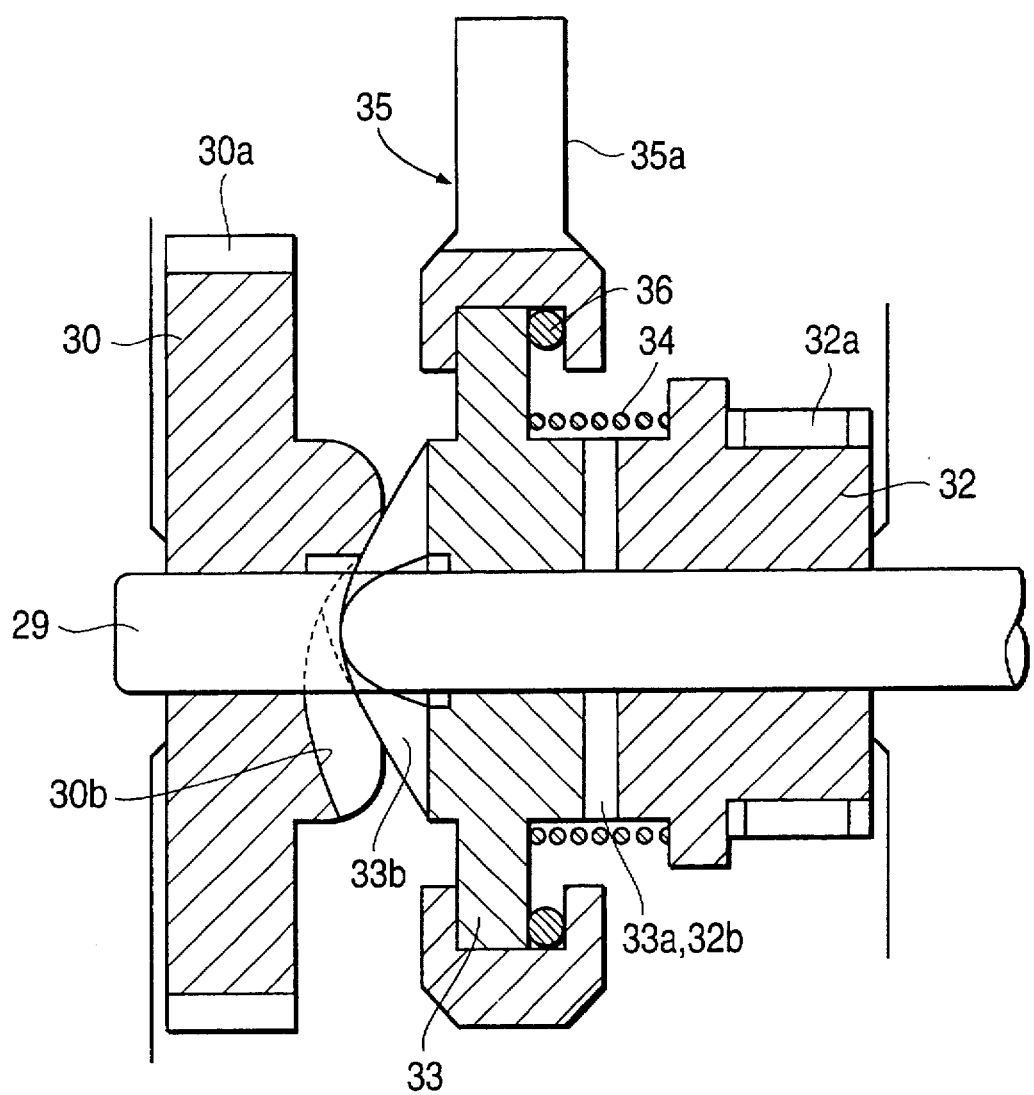
Figure 11A:
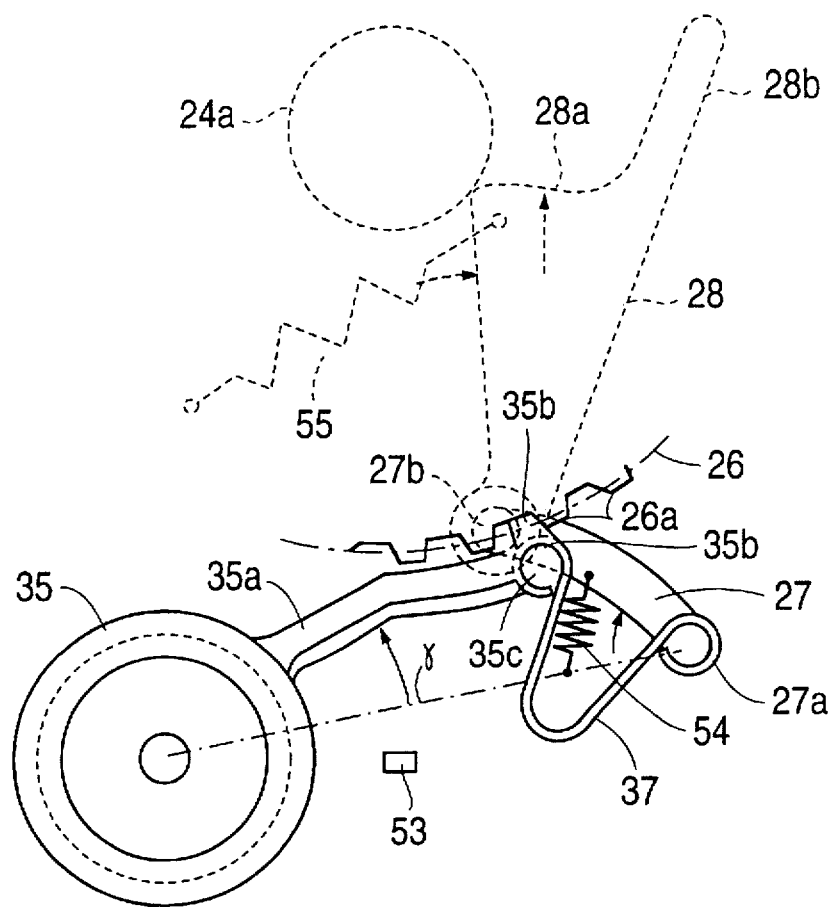

One end of the U-shaped spring 37 is supported by the spring supporting projection 35c of the lever member 35 and the other is supported by the support shaft 27b of the friction lever 27. The U-shaped spring 37 prevents the arm 35a from swaying. The U-shaped spring 37, as shown in FIG. 9A, biases the arm 35b to keep the arm 35a apart from the gear holder 26 when the spring supporting projection 35c of the arm 35a is on the opposite side of the gear hole relative to the line g in the figure connecting the rotating axis of the lever member 35 and the middle of the pivotal axis 27a of the friction lever 27. The U-shaped spring 37 on the other hand, biases the arm 35a toward the gear holder 26 when the spring supporting projection 35c is on the side of the gear holder 26 relative to the line g, as shown in FIGS. 10A and 11A.

The pivoting of the arm 35a away from the gear holder 26, as shown in FIG. 9A, is restricted by a stopper 53. Thus, even if the spring supporting projection 35c is on the other side of the gear holder 26 relative to the line g, and even if the arm 35a is biased away from the gear holder 26 by the U-shaped spring 37, the stopper 53 blocks the arm 35a from further pivoting away from the gear hold.

The electric motor 40 of the belt tension control mechanism 7 is installed in the frame 2. The driving force of the electric motor 40 is transferred to the drive side gear clutch 30 by way of the first gear transfer mechanism 38. The driving force of the electric motor 40 is further transferred to the gear holder 26 through the clutch plate 33, the driven side gear clutch 32, and the second gear transfer mechanism 39 when the teeth 32b of the driven side gear clutch 32 and the teeth 33a of the clutch plate 33 are engaged with each other.

The tension provided 8 is also well known in the art and the reel shaft 4, as illustrated in FIG. 1, is biased in the seat belt winding direction β by a spiral spring 41 through the drive shaft 24.

Further, the electric motor 40, as shown in FIG. 1, is connected to a central processing unit (hereinafter referred to as CPU) 42, consisting of a microcomputer or the like. A front object detection sensor 43, a belt tension detection sensor 67, a buckle switch 69, and a vehicle speed sensor 70 are all connected to the CPU 42.

Figure 7:
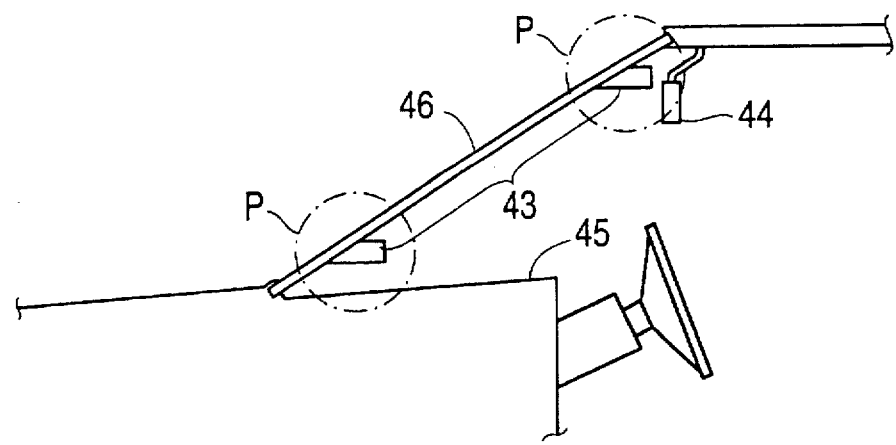
FIG. 7 shows a view for explaining mounting positions of the front object detection sensors.
Figure 8A:
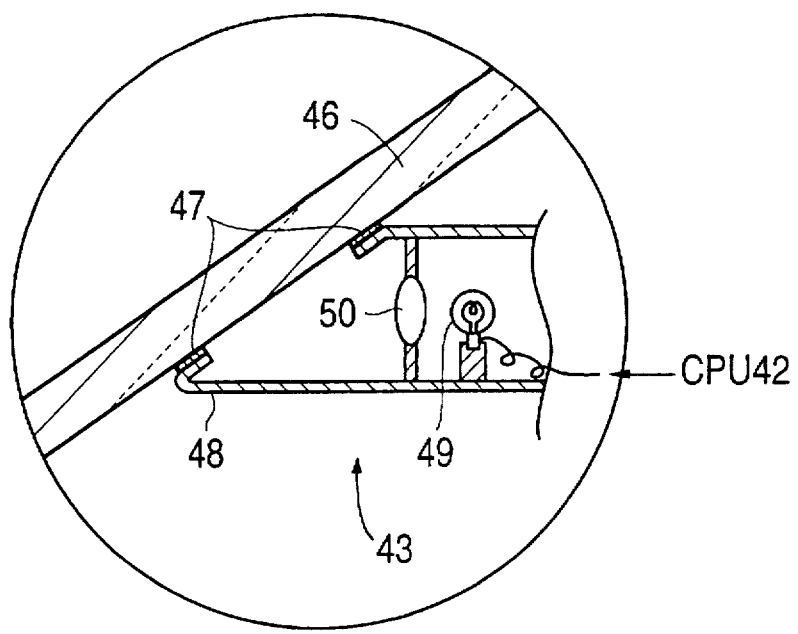
FIG. 8A shows a sectional view of the light source and FIG. 8B shows a sectional view of the light receiving part, schematically showing a state in which the object detection sensor is adhered to the front windshield.
Figure 8B:
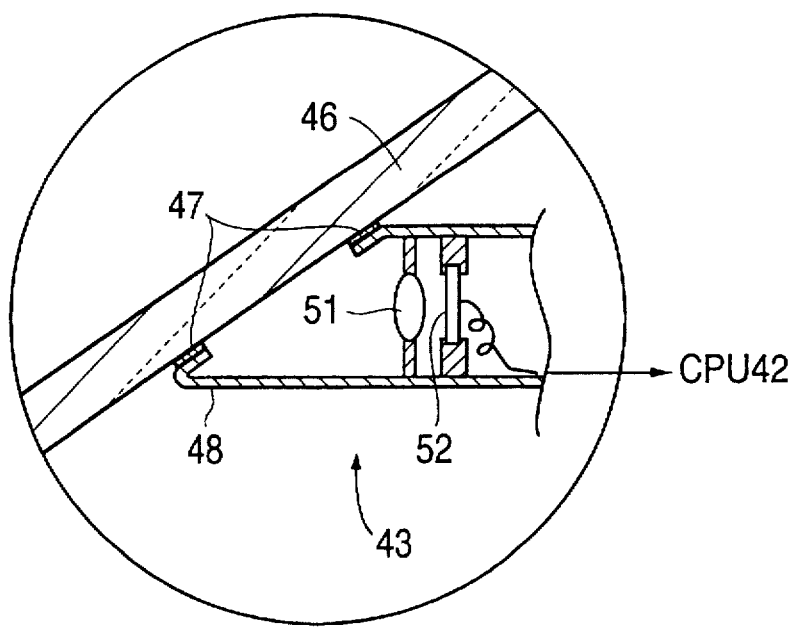

As shown in FIG. 7, the front object detection sensors 43 are installed in predetermined positions P, P on a front windshield 46 at the cabin side, for example, near a rear view mirror 44, next to an instrument panel 45, or in a wiper covering area. In this embodiment of the present invention, the front object detection sensor 43 is of an optical sensor type. The front object detection sensor 43, as shown in FIGS. 8A and 8B, comprises a sensor casing 48 adhered to the front windshield 46 with an adhesive 47, a light source which emits light in front of the vehicle, and a light receiver which receives reflected light from objects in front. The light source has a lamp (LED or LD) 49 to emit light and a lens 50 which collects the light from the lamp 49 and irradiates it toward the front of the vehicle. The light receiver comprises a lens 51 for collecting the reflected light from objects and an optical sensor (PSD) 52 which receives the reflected light from the lens 51 to convert the reflected light into an electrical signal to transmit to the CPU 42. The front object detection sensor 43 detects objects in front of the vehicle, and transmits the object detection signal to the CPU 42.

Also, the belt tension detection sensor 67 detects the tension applied to the seat belt 3 while in use, and transmits the detection signal to the CPU 42. Further, the buckle switch 69 detects whether the seat belt is worn or not; i.e. it detects the connection of a buckle and a tongue, and transmits the detection signal to the CPU 42. The vehicle speed sensor 70 detects the speed of the vehicle, and transmits the detection signal to the CPU 42.

The front object detection sensor 43 is not limited to be an optical sensor and instead of this, other object detector using, for example, radio waves, such as millimeter waves, ultrasonic waves, or image recognition may be employed. More than one front object detection sensor 43 may be installed, and the front objection sensor 43 may be constructed to scan left to right and top to bottom.

The operation of the seat belt retractor of the above description will be described below.

I. Operation of The Belt Tension Control Mechanism 7

When the CPU 42 judges that the operational requirements of the belt tension control mechanism 7 are met, upon the object detection signal transmitted from the front object detection sensor 43, the CPU 42 operates the electric motor 40 to rotate in either the seat belt unwinding direction α or the winding direction β, depending on the operational requirements.

Figure 9B:
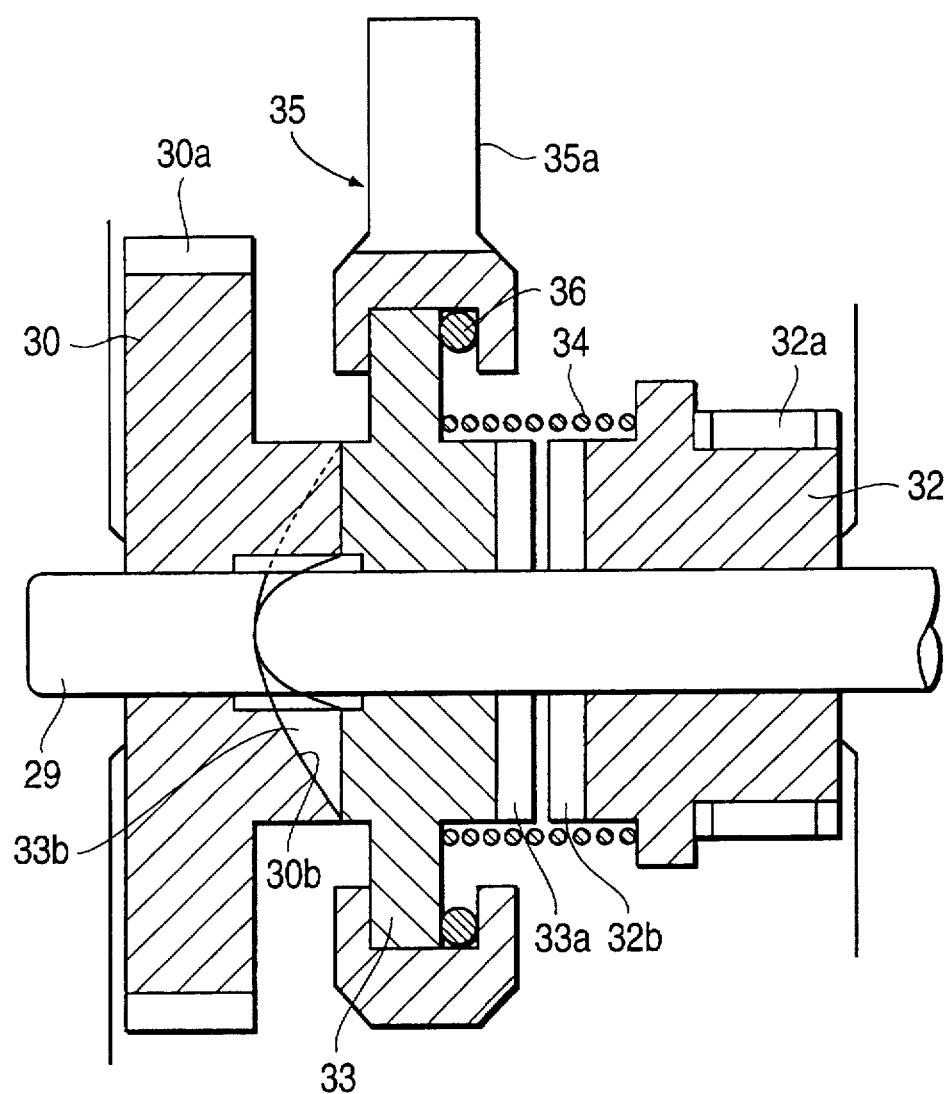

When the electric motor 40 rotates in the unwinding direction α, the drive side gear clutch 30 and the clutch plate 33, by way of the first gear transfer mechanism 38, both rotate in the same direction α from the state shown in FIGS. 9A and 9B. As the clutch plate 33 rotates, the lever member 35 rotates in the direction α, the same direction as that of the clutch plate 33. Then, the arm 35a of the lever member 35 becomes to contact with the support shaft 27b of the friction lever 27 as shown in FIG. 10A. As the spring supporting projection 35c has moved over the line g to the side of the gear holder 26 at this point, the arm 35a is biased in the same direction α by the spring force of the U-shaped spring 37.

The arm 35a of the lever member 35 further rotating in the direction α causes the friction lever 27 to pivot around the pivotal axis 27a in the unwinding direction α against the spring force of the return spring 54. With the pivotal movement of the friction lever 27 in the unwinding direction α, the support shaft 27b pivots in the same direction, causing the friction plate 28 to move upward as shown in FIG. 10A so that the arc portion 28a of the friction plate 28 comes in contact with the larger circumference 24a of the drive shaft 24. Thus, the rotations of the lever member 35 and of the clutch plate 33 are stopped.

However, even though the rotation of the clutch plate 33 is stopped, the drive side gear clutch 30 is still free to rotate further in the unwinding direction α. The cam surface 30b of the drive side gear clutch 30 and the cam surface 29a of the rotation shaft, therefore, press the rotation shaft 29 and the protrusion 33b towards the driven side gear clutch 32. Thus, both the rotation shaft 29 and the clutch plate 33 slide toward the driven side gear clutch 32, thereby causing the teeth 33a of the clutch plate 33 to engage the teeth 32b of the driven side gear clutch 32. The clutch plate 33 and the driven side gear clutch 32 are connected in this way.

When the driving force of the electric motor 40 becomes greater than the frictional resistance of the clutch plate 33 created by the spring clutch 36, the driving force of the electric motor 40 is transferred to the driven side gear clutch 32 by way of the clutch plate 33 because the clutch plate 33 and driven side gear clutch 32 are connected. The driving force, further, is transferred to the gear holder 26 through the second gear transfer mechanism 39. As a result, the gear holder 26 rotates in the unwinding direction α, causing the drive shaft 24 and the reel shaft 4 to rotate in the same direction α. This is how the seat belt 3 is unwound.

With the rotation of the larger circumference 24b of the drive shaft 24 in the unwinding direction α, the friction created between the larger circumference 24b and the arch portion 28a causes the friction plate 28 to pivot clockwise against the spring force of the return spring 55 as shown in FIG. 11A. As the pivotal movement of the friction plate 28 causes the arc portion 28a to detach the larger circumference 24b, the friction plate 28 in FIG. 11A becomes free to move further upward. Thus, the lever member 35 also rotates further in direction α, causing the engaging part 35b of the arm 35a to engage one of the teeth 26a of the gear holder 26. When the electric motor 40 stops by a timer or the belt tension detection sensor 67, the rotation of the reel shaft 4 in direction α also stops, thereby stopping the unwinding of the seat belt 3.

When the unwinding of the seat belt 3 is stopped, the driving force of the electric motor 40 will not be transferred to the lever member 35, as the driving of the electric motor 40 is suspended. However, since the arm 35a, in this state, is biased in the direction for the engaging part 35b to engage with one of the teeth 26a, the engagement between the engaging part 35b and one of the teeth 26a is held.

Also in this state, the force of the tension provider 8 is not transferred to the seat belt 3, as the reel shaft 4 is blocked from rotating in either the unwinding direction α or the winding direction β. Therefore, the seat belt 3 is held in a tensionless state.

Upon releasing the engagement between the engaging part 35b and the cog 26a, the CPU 42 turns on the electric motor 40 in the winding direction β. As the drive side gear clutch 30 rotates in the winding direction β when the motor is turned on, the protrusion 33b of the clutch plate 33, guided by the cam surface 30b, shifts in the axial direction. As a result, the engagement between the teeth 33a and 32b are released, thereby releasing the connection of the clutch plate 33 and the driven side gear clutch 32. Subsequently, the drive side gear clutch 30, the driven side gear clutch 32 and the clutch plate 33 return to the same state as shown in FIG. 9B.

Also, with the electric motor 40 further driving in the winding direction β, the drive side gear clutch 30 rotates in the same direction β. As the rotation of the drive side gear clutch 30 causes the clutch plate 33 to rotate in the same direction β, the lever member 35 rotates in the direction for its arm 35a to separate from the gear holder 26. As a result, the engaging part 35b disengages from the teeth 26a, leaving the gear holder 26 free to rotate. Thus, the force from the tension provided 8 is transferred to the seat belt 3 through the reel shaft 4.

When the lever member 35 further rotates to the same direction and the arm 35a comes into contact with the stopper 53, the drive of the electric motor 40 stops. Since the spring supporting projection 35c is positioned opposite to the gear holder 26 relative to the line g in this state, the arm 35a is held in contact with the stopper 53 by the spring force of the U-shaped spring 37. The belt tension control mechanism 7, in this way, return to the initial state as shown in FIG. 9A.

On the other hand, when the electric motor 40 drives in the winding direction β from the state of the seat belt retractor 1 as illustrated in FIGS. 9A and 9B, the drive side gear clutch 30 and the clutch plate 33, through the first gear transfer mechanism 38, attempt to rotate in the same direction β from the state as illustrated in FIGS. 9A and 9B. However, as the arm 35a of the lever member 35 is in contact with the stopper 53, the clutch plate 33 and the lever member 35 are prevented from rotating in the direction β.

Although the clutch plate 33 is prevented from rotating in the direction β, the drive side gear clutch 30 further rotates in the winding direction β. The cam surface 30b of the drive side gear clutch 30 and the cam surface 29a of the rotation shaft press the rotation shaft 29 and the protrusion 33b towards the driven side gear clutch 32. Thus, both the rotation shaft 29 and the clutch plate 33 slide toward the driven side gear clutch 32, thereby making the teeth 33a of the clutch plate 33 to engage the teeth 32b of the driven side gear clutch 32. The clutch plate 33 and the driven side gear clutch 32 are connected in this way.

When the driving force of the electric motor 40 becomes greater than the frictional resistance of the clutch plate 33 created by the spring clutch 36, the driving force of the electric motor 40 is transferred to the driven side gear clutch 32 by way of the clutch plate 33, because the clutch plate 33 and driven side gear clutch 32 are connected. The driving force, further, is transferred to the gear holder 26 through the second gear transfer mechanism 39. As a result, the gear holder 26 rotates in the unwinding direction β, causing the drive shaft 24 and the reel shaft 4 to rotate in the same direction β. This is how the seat belt 3 is wound up. Thus, the seat belt 3 is tensioned by the winding force of the electric motor 40. When the belt tension reaches a predetermined level, the CPU 42 stops the drive of the electric motor 40.

As the electric motor 40 stops, no winding force by the drive of the electric motor 40 is transferred to the reel shaft 4 and no resistance against the unwinding direction α is caused so that the reel shaft 4 gradually rotates in the unwinding direction α by the biasing force of the tension provider 8, thereby gradually reducing the belt tension applied to the seat belt 3. The belt tension of the seat belt 3 becomes finally equal to the level of the force provided by the tension provider 8.

II. When the belt tension control mechanism 7 does not operate to rotate the reel shaft in the seat belt unwinding direction α:

In this state, the friction lever 27, the friction plate 28, and the lever member 35 are positioned as shown in FIG. 9A. Therefore, the arc portion 28a of the friction plate 28 is spaced apart from the larger circumference 24a of the drive shaft 24, and the side of the radial projection 28b of the friction plate 28 is in contact with the larger circumference 24a. The engaging part 35b of the lever member 35, further, is at a non-engaging position away from the teeth 26a of the gear holder 26. The arm 35a is held in contact with the stopper 53 which prevents the arm from further rotating in the direction away from the gear holder 26.

Thus, seat belt retractor will operate normally as a conventional seat belt retractor.

(i) Normal condition where the vehicle is not decelerated at a rate exceeding the predetermined rate:

In this state, the deceleration sensor 6 does not operate, and the seat belt retractor 1 is positioned as shown in FIG. 1 or FIG. 4. In such state, the engaging part 23a of the engaging lever 23 is in a non-engaging position away from the external teeth 18a of the ring member 18, and the engaging portion 10a of the pawl 10 is also in a non-engaging position from the external teeth 9a of the ratchet wheel 9. Therefore, the reel shaft 4 can rotate freely in this state, and the seat belt 3 is biased in the winding direction β by the tension provider 8 through the drive shaft 24.

Where the seat belt 3 is not in use

In this state, the tongue (not shown) attached to the seat belt 3 and the buckle member (not shown) are not engaged. Therefore, the seat belt 3 is wound up by the reel shaft 4 by the biasing force of the tension provider 8.

Where the seat belt 3 is unwound

When an occupant pulls out the seat belt 3 to wear it, the reel shaft 4 rotates in the unwinding direction α against the force of the tension provider 8. Thus, the seat belt 3 can be unwound freely.

Where the occupant does not touch the seat belt 2 after engaging the tongue to the buckle When the occupant engages the tongue and the buckle member, the seat belt is pulled out longer than the length required when properly fitted. Therefore, when the occupant lets go the seat belt 3 after engaging, the seat belt 3 is wound up by the force of the tension provider 8 until the belt fits the body of the occupant. At this time, the seat belt is tensioned only by the force of the tension provider 8. However, when the vehicle starts moving and becomes to travel at a predetermined speed (10–20 km/h) as described later, the belt tension control mechanism 7 operates, and the seat belt 3 is held in the tensionless state without any tension applied to the seat belt 3 (in case of comfort mode to be mentioned later).

Where the seat belt 3 is not in use after the engagement between the tongue and buckle members is released When the occupant releases the engagement between the tongue and buckle members of the seat belt 3 to take off the belt, the belt tension control mechanism 7 is deactivated after receiving a buckle release signal from the buckle switch 69. The seat belt 3 is wound up onto the reel shaft 4 by the force of the tension provided 8, as in the state when the seat belt is not in use.

(ii) Seat belt condition where the vehicle is decelerated at a rate exceeding the predetermined rate:

When the vehicle is decelerated at a rate exceeding the predetermined rate during traveling by emergency braking, the seat belt lock 5 is activated. As a first step, the inertial member 22 tilts forward, making the engaging lever 23 to pivot toward the ring member. The engaging part 23a of the engaging lever 23 is therefore moved to engage the external teeth 18a of the ring member 18. Meanwhile, as the occupant moves forward because of the deceleration, the seat belt 3 is pulled out. With the pulling out of the seat belt 3, the reel shaft 4, the ratchet wheel 9, the retainer 14, the carrier 15, the disk member 17 and the ring member 18 all rotate in the seat belt unwinding direction α. As the external teeth 18a of the ring member 18 immediately engage the engaging part 23a, the rotation of the disk member 17 and the ring member 18 in the seat belt unwinding direction α is stopped.

As the occupant tends to move forward, the seat belt 3 is further pulled out, and the reel shaft 4, the ratchet wheel 9, the lock ring 13 and the retainer 14 all rotate in the seat belt unwinding direction α. Thus, the retainer 14 and the disk member 17 relatively rotate in opposing directions, making the carrier 15 to shift towards the radial direction (upward in FIG. 3) guided by the guides 14a and 14b. The shift of the carrier 15 causes the engaging protuberance 15e of the carrier 15 to engage the internal teeth 13a of the lock ring 13. When the moment in the unwinding direction α applied to the disk member 17 exceeds the spring force of the ring-like spring 19 by further pulling out the seat belt 3, the carrier 15 and the disk member 17 rotate in the unwinding direction α.

The rotation of the carrier 15 in the unwinding direction α causes the engaging protuberance 15e to engage one of the internal teeth 13a, thereby rotating the lock ring 13 in the unwinding direction α. The rotation of the lock ring 13 in the unwinding direction α moves the cam follower 10b of the pawl 10 with the cam follower 10b being guided the cam hole 13b. With the movement of the cam follower 10b, the pawl 10 pivots toward the ratchet wheel 9 to bring the engaging portion 10a of the pawl 10 close to the engaging position with the external teeth 9a. With further pivotal movement of the reel shaft 4 and the ratchet wheel 9 in the unwinding direction α, the engaging portion 10a engages one of the external teeth 9a. As a result of this, the rotation of the reel shaft 4 and the ratchet wheel 9 is stopped, thereby preventing the seat belt 3 from being unwound. In this manner, the occupant can be securely restricted and protected by the seat belt 3.

(iii) Seat belt condition when pulled out rapidly:

When the seat belt 3 is pulled out quite rapidly relative to the normal speed, the reel shaft 4, ratchet wheel 9, and retainer 14 all rotate in the unwinding direction α rapidly. However, the inertial member comprising the disk member 17 and the ring member 18 does not keep up with the rapid rotation, causing an operational delay. The operational delay causes the relative rotation between the retainer 14 and the disk member 17. In the same manner as the emergency braking, the relative rotation makes the carrier to move in a radial direction so that the engaging portion 15a engages one of the external teeth 9a of the ratchet wheel. Accordingly, the rotation of the reel shaft 4 is stopped so as to prevent the seat belt 3 from being unwound.

When the belt tension control mechanism 7 is in non-operational state, whether the reel shaft 4 rotates either in the unwinding direction α or the winding direction β, each wheel of the second gear transfer mechanism 39 and the driven side gear clutch 32 still rotate together with the reel shaft 4. Since the clutch teeth 32b and the clutch teeth 33a are not engaged, each wheel of the first gear transfer mechanism 39 and the electric motor 40, however, do not rotate together with the reel shaft 4.

III. Where the belt tension control mechanism 7 operates to rotate the reel shaft in the unwinding direction α:

In this case, since the gear holder 26 is stopped as shown in FIG. 11A, the reel shaft 4 rotates neither in the unwinding direction α nor the winding direction β. Therefore, regardless of the operation of the deceleration sensor 6, the seat belt 3 is prevented from being unwound. Even when the vehicle decelerated at a rate which activates the deceleration sensor 6, the occupant can be securely restricted and protected by the seat belt 3.

The occupant restraint system according to this embodiment is capable of selectively operating in four modes in controlling the winding and unwinding of the seat belt 3. As shown in FIG. 12, the four modes comprises a comfort mode, a precautionary mode, a warning mode, and an emergency mode.

In the comfort mode, the winding force for the seat belt 3 is set to 0 kgf in the operation of the system. In this mode, the winding force for the seat belt 3 by the tension provider 8 is canceled by driving the electric motor 40 in the seat belt unwinding direction α. That is, the tension to the seat belt 3 is canceled so that the seat belt 3 is set in the tensionless state. In this embodiment, three conditions set for operating the occupant restraint system in the comfort mode are: (1) that no object is detected; (2) that a detected object never get closer; and (3) that even when a detected object tends to get closer, the occupant has enough time for avoiding the object, or the occupant is already avoiding the object.

It is decided that one of the conditions of comfort mode is met when no object detection signal is outputted from the front object detection sensor 43, when the difference between the vehicle speed and the speed of the object i.e. the relative speed between the vehicle and the object is 0 or less, i.e. the relative speed≦0, if the object detection signal is outputted from the front object detection sensor 43, or when no other mode is set. The occupant restraint system is operable to set the comfort mode after a predetermined period (for example 3–5 seconds) from when it is decided that one of the conditions of comfort mode is met.

For setting the occupant restraint system in the comfort mode, with the occupant sitting up straight in the vehicle seat and wearing the seat belt 3, as a first step, the CPU 42 drives the electric motor 40 to rotate in the winding direction after a predetermined period from when the vehicle speed exceeds the predetermined speed. The rotation of the electric motor 40 causes the seat belt 3 to be wound up until the belt fits the body of the occupant. In this state, the CPU 42 sets the initial condition upon deciding whether the occupant restraint system is in the normal condition and checking whether the occupant is sitting up straight. After that, the CPU 42 drives electric motor 40 to rotate in the unwinding direction to cancel the winding force of the tension provider 8 to make the seat belt 3 in the tensionless state. In this way, the occupant restraint system is set in the comfort mode.

For setting the occupant restraint system in the comfort mode from the other mode, after a predetermined period from when one of the conditions of the comfort mode is met, the seat belt 3 is wound up for a time and then the comfort mode is set in the same way as mentioned above.

When the seat belt 3 is pulled out due to the movement of the occupant in the state that the system is set in the comfort mode, the seat belt 3 is applied with the force of a memory spring built in the gear holder 26. The force is set to 0.5 kgf or less. When the occupant returns to the original position, the force of the memory spring is canceled to return the seat belt 3 in the tensionless state.

In the precautionary mode, the belt tension of the seat belt 3 is set to a tension produced only by the force (for example, 0.50 kfg) of the tension provider 8. That is, the belt tension is not under the influence of the winding force by the driving force of the electric motor 40. Two conditions set for operating the occupant restraint system in the comfort mode are: (1) that the occupant is wearing or taking off the seat belt 3; and (2) that, when a detected object tends to get closer during the vehicle runs at a speed more than 10–20 km/h, the occupant has not enough time for avoiding the object.

For deciding that one of the conditions is met, the first condition is judged by detecting whether the engagement between the tongue and the buckle is accomplished or released. That is, a detecting sensor is installed in at least either of the tongue or the buckle so as to judge whether the engagement between the tongue and the buckle is accomplished or released, by an output signal from the detecting sensor.

On the other hand, the second condition is judged by deciding whether the vehicle speed Vs is more than 10–20 km/h (Vs≧10–20 km/h). When it is decided that the vehicle speed Vs is more than 10–20 km/h, the relative distance Dr and the relative speed Vr between the vehicle and the object in the front-rear direction are obtained from the object detection signal from the front object detection sensor 43. Where the vehicle speed Vs is higher than the relative speed Vr and the relative speed Vr is positive (Vs>Vr≧0), (i) it is decided that the object is a vehicle running ahead of the vehicle in the same direction and the relative distance tends to be shorten, i.e. case of follow driving. In addition, where the vehicle speed Vs is less than the relative speed Vr, (ii) it is decided that the object is a stationary or an oncoming vehicle.

In case of (i) above, i.e., follow driving:

The safe distance Ds from the vehicle running ahead of the vehicle when the vehicle is decelerated at the same deceleration d (for example 4–6 m/sec²) is obtained by Expression 1 as follows:

Expression 1

$$Ds = Vs \cdot Td - d \cdot Td^2 + De$$

Vs: Vehicle Speed
Ds: Safe Distance between Vehicles
Td: Response Delay of Driver (0.5–1.0 sec.)
d: Preset Deceleration (e.g. 4–6 m/sec²)
De: First Preset Margin Distance (e.g. 5 m)

When the relative distance Dr is less than the safe distance Ds (Dr≦Ds), it is decided that the two conditions are met. In case of (ii) above, i.e., stationary or oncoming vehicle:

The safe distance Ds from the stationary or oncoming vehicle when the vehicle is decelerated at the same deceleration d is obtained by Expression 2 as follows:

Expression 2

$$Ds = Vs \cdot Td - Vr^2/2d + De$$

Vs: Vehicle Speed
Ds: Safe Distance from object
Td: Response Delay of Driver (0.5–1.0 sec.)
d: Preset Deceleration (e.g. 4–6 m/sec²)
De: First Preset margin Distance (e.g. 5 m)

When the relative distance Dr is less than the safe distance Ds (Dr≦Ds), it is decided that the two conditions are met.

As it is decided that one of the conditions of the precautionary mode is met, the occupant restraint system is operated in the precautionary mode.

For setting the occupant restraint system in the precautionary mode, the CPU 42 drives the electric motor 40 to rotate in the winding direction after a predetermined period from when it is decided that one of the conditions of the precautionary mode is met. Therefore, the seat belt 3 is tensioned only by the winding force of the tension provider 8. After that, the CPU 42 stops electric motor 40. In this way, the occupant restraint system is set in the precautionary mode.

In the warning mode, the seat belt 3 is applied with first preset belt tension (for example, 2–3 kgf) by winding the seat belt 3 with the driving force of the electric motor 40 in operation of the system. The first preset belt tension is set to a load so that the occupant feels a sense of pulling out the seat belt 3 and the occupant is allowed to moves forward to some degree. In such a way, by straightening up the occupant body, the system provides an effect of keeping the occupant awake. Furthermore, as the occupant feels a sense of pulling out the seat belt 3, the occupant can know a warning by feeling in the body in addition to a normal warning devices such as an alarm or a warning lamp as described later.

Moreover, in the warning mode, the occupant is called attention by an alarm, a warning lamp, or the both. The condition for operating the occupant restrictive protection system in the warning mode is 1. that the detected object tends to get closer and immediate movement of the occupant to avoid the object is necessary.

A method of deciding whether the condition for operating in the warning mode is met is substantially the same. The safe distance Ds is obtained using Expressions 1 and 2. When the safe distance Ds is more than the relative distance Dr, it is decided that the condition 1 is met. In this warning mode, however, a second preset margin distance (e.g. 2 m)

shorter than the first preset margin distance (e.g. 5 m) of the safe distance Ds for the precautionary mode is used instead of first preset margin distance used in Expressions 1 and 2 to obtain the safe distance Ds. As it is decided that the condition for the warning mode is met, the occupant restraint system is operated in the warning mode.

For setting the occupant restraint system in the warning mode, the CPU 42 drives the electric motor 40 to slowly rotate in the winding direction in the same way of the precautionary mode after sounding the alarm and/or turning on the warning lamp. Therefore, the seat belt 3 is tensioned by the winding force of the tension provider 8. After that, the CPU 42 stops electric motor 40. In this way, the occupant restraint system is set in the warning mode.

In the emergency mode, the seat belt 3 is applied with a second preset belt tension (for example, greater than 5 kgf) greater than the first preset belt tension by winding the seat belt 3 with the driving force of the electric motor 40 in operation of the system. The second preset belt tension is set to a load so that the occupant feels the tension of the seat belt 3 tightly and the lap portion of the seat belt is wound up to some degree. Moreover, in the emergency mode, the occupant is called attention by an alarm, a warning lamp, or the both.

The condition for operating the occupant restrictive protection system in the emergency mode is 1. that the occupant can not avoid a collision with the detected object.

For deciding whether the condition is met, it is first decided whether the vehicle speed Vs is higher than 10–20 km/h. When the vehicle speed Vs is higher than 10–20 km/h (Vs≧10–20 km/h), the relative speed Vr and the relative distance Dr between the vehicle and the object are obtained from the object detecting signal from the front object detection sensor 43. On the other hand, a distance (Vr·Ts) converted with a predetermined completion time Ts (e.g. 0.3 sec.) of the system based on the relative speed Vr is obtained. There is a third preset margin distance De' (for example, 2 m), then the sum (Vr·Ts+De') of the converted distance (Vr·Ts) of the completion time Ts and the third preset margin distance De' is obtained. Whether a vehicle as the object is running ahead of the vehicle or not, when the relative speed Vr is less than the sum (Vr·Ts+De') (i.e. Vr≦Vr·Ts+De'), it is decided that the condition for the emergency mode is met. As it is decided that the condition for the emergency mode, the occupant restraint system is set in the emergency mode.

For setting the occupant restraint system in the emergency mode, the CPU 42 drives the electric motor 40 to rapidly rotate in the winding direction to wind up the seat belt 3 rapidly after sounding the alarm and/or turning on the warning lamp. The winding-up speed is set to be less than the unwinding speed of the seat belt by a normal pretentioner. Therefore, the seat belt 3 is applied with the second preset belt tension by the driving force of the electric motor 40. After that, the CPU 42 stops electric motor 40. In this way, the occupant restraint system is set in the emergency mode.

Figure 13:
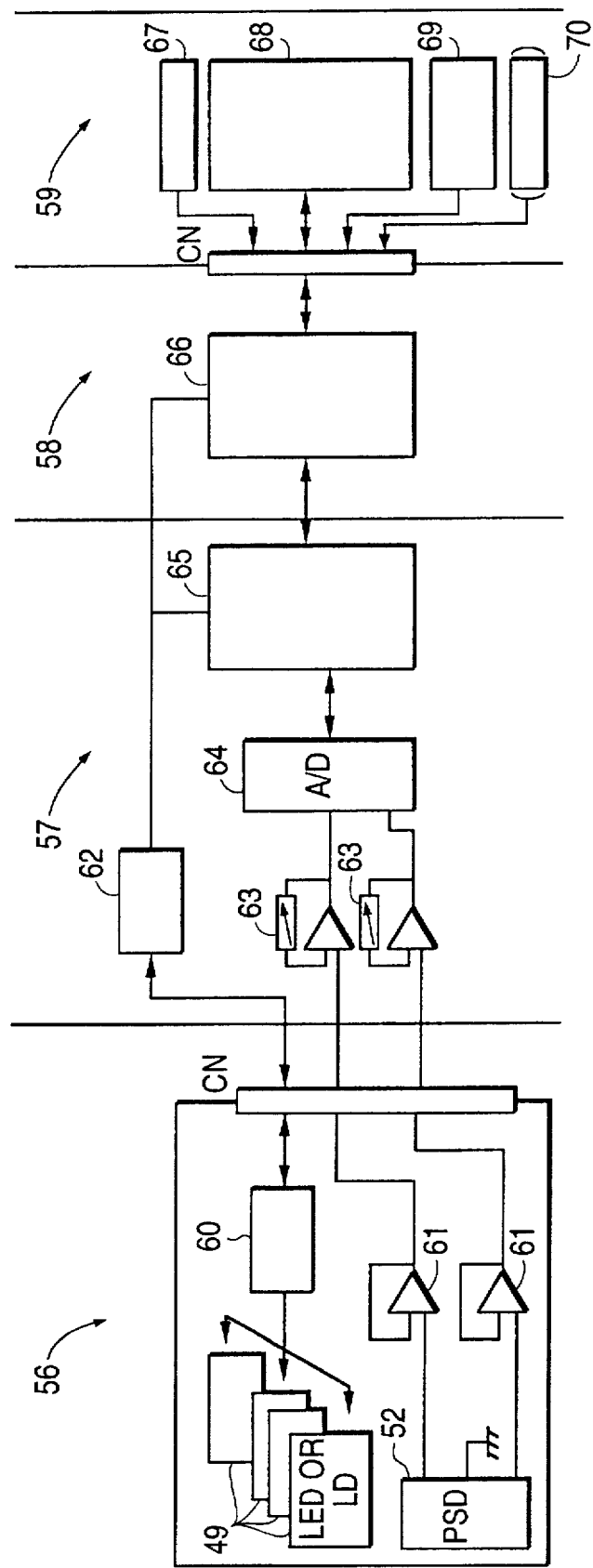
FIG. 13 shows a view schematically showing the control block of the occupant restraint system.

FIG. 13 is a block diagram of the belt tension control mechanism 7 according to this embodiment.

As shown in FIG. 13, the control block of the belt tension control mechanism 7 comprises mainly 4 blocks: a sensor unit 56; an input arithmetic unit 57; a control unit 58; and a control object and sensor part 59.

The sensor unit 56, which detects an object, comprises a plurality of lamps 49 (LED or LD) of the front object detecting sensor 43 (FIG. 7), an optical sensor (PSD) 52, a light-source-side development logic circuit 60, and light-receiving-side pre-amplifiers 61. The lights from the lamps 49 are reflected by the object and then received by the optical sensor (PSD) 52. The optical sensor 52 converts the reflected lights to an electric signal which is then amplified through the pre-amplifiers 61 and transferred to the input arithmetic unit 57

The sensor unit 56 is set with a measuring distance to be 30–50 m apart from the object, a detected angle to be ±30°, and beams from the lamps 49 capable of being fixed or scanned. It should be noted that the above values are not limited so that various values may be set for the sensor unit 56.

The input arithmetic unit 57 comprises a timing controller 62, auto gain controllers 63, an analog-to-digital (A/D) converter 64, and an arithmetic unit 65. The timing controller 62 receives a control signal form the control unit 58 and transmits the control signals for turning on the lamps 49. The gain of the electric signal of the reflected lights from the sensor unit 56 is controlled by the auto gain controllers 63 and is converted to a digital signal by the A/D converter 64. The arithmetic unit 65 computes vectors of the position and speed of the object based on the electric signal of the reflected lights which is converted to the digital signal, computes the relative speed, relative distance, safe distance, and distance corresponding to the system completion time, and transfers them to the control unit 58.

The control unit 58 comprises a CPU control unit 66. The CPU control unit 66 transfers a control signal to the timing controller 62 and the arithmetic unit 65 to detect an object by using an object detecting algorithm stored therein. The CPU control unit 66 also decides which mode is set for the relation between the vehicle and the object, by using the object detecting algorithm based on each data of the object, a seat-belt worn signal, a vehicle speed signal which are sent from the arithmetic unit 65. The CUP control unit 66 transfers the control signal to the control object and sensor part 59 to be in the decided mode, in view of the belt tension signal from the control object and sensor 59 part.

The control object and sensor part 59 comprises a belt tension detecting sensor 67, a seat belt retractor mechanism 68 including the electric motor 40, a buckle switch 69, and a vehicle speed sensor 70. The belt tension detecting sensor 67 detects the belt tension of the seat belt 3 (FIG. 1) and outputs a detection signal to the control unit 58. The seat belt retractor mechanism 68 is activated by the control signal from the control signal 58 to control the belt tension of the seat belt 3. Furthermore, the buckle switch 69 outputs the seat-belt worn signal to the control unit 58 when the occupant wears the seat belt 3 by engaging the tongue and the buckle. The vehicle speed sensor 70 detects the vehicle speed of the vehicle to output the vehicle speed signal to the control unit 58.

Figure 14:
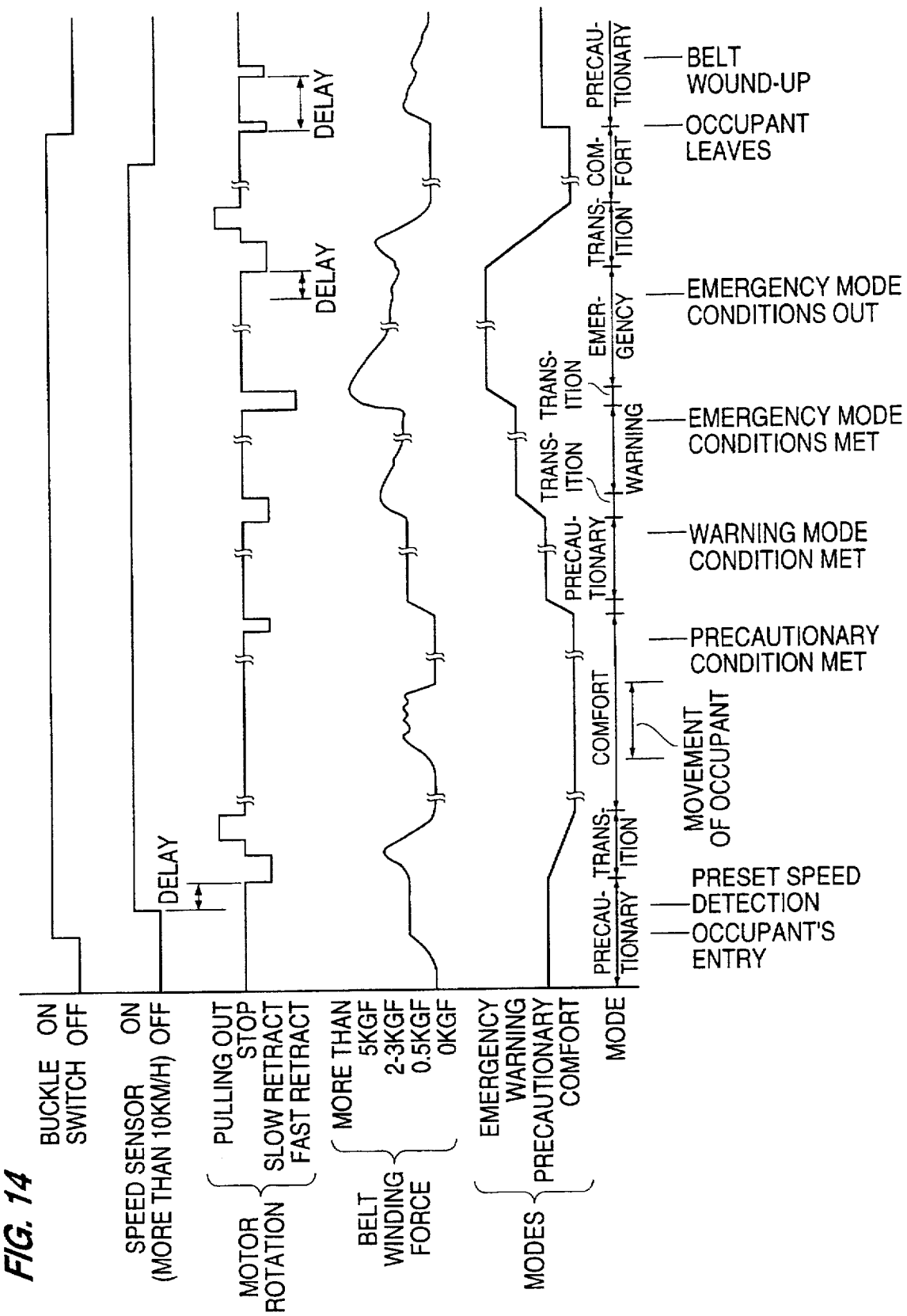
FIG. 14 shows a view showing the operational timing for the occupant restraint system.

FIG. 14 shows an operational timing of the occupant restraint system.

As shown in FIG. 14, as the occupant sits in the seat of the vehicle and engages the tongue to the buckle to wear the seat belt 3, the buckle switch is turned on. In this state, the belt tension is 0.5 kgf which is decided by the tension provider 8. As the vehicle is started and accelerated to make its speed to 10 km/h, the vehicle speed sensor 70 is turned on.

After a predetermined period from when the vehicle speed sensor 70 is turned on, the electric motor 40 slowly rotates in the winding direction β for a time, thereby winding up the seat belt 3. When the belt tension reaches about 2–3 kgf, the electric motor 40 is stopped. Accordingly, the belt tension is gradually reduced. After a short period from when the electric motor 40 is stopped, the electric motor 40 slowly rotates in the unwinding direction α. Therefore, the belt tension is relatively quickly reduced and the biasing force of the tension provider 8 is canceled to be 0 kgf, making the seat belt in the tensionless state. As the seat belt is in the tensionless state, the electric motor 40 is stopped. In this way, the occupant restraint system is set in the comfort mode. In the comfort mode, the gear holder 26 is held so that the seat belt 3 is held in the tensionless state. During normal driving, the occupant restraint system is held in the comfort mode.

When the occupant moves to pull out the seat belt 3 in the comfort mode, the seat belt 3 is applied with the biasing force of the memory spring built in the gear holder 26. The biasing force is set to be less than 0.5 kgf. As the occupant come to a standstill, the seat belt 3 is wound up until the biasing force becomes 0 kgf by the tension provider 8 so that the seat belt becomes in the tensionless state again.

When one of the conditions for operating in the precautionary mode is met, the electric motor 40 slowly rotates in the winding direction β after the predetermined period. In this case, the hold of the gear holder 26 is canceled by a slight rotation of the electric motor 40. The reel shaft 4 is biased by the tension provider 8, thereby canceling the comfort mode. As the holed of the gear holder 26 is canceled, the electric motor 40 is stopped. Therefore, the seat belt 3 is tensioned only by the force of the tension provider 8. In this way, the occupant restraint system is set in the precautionary mode. In the precautionary mode, since the belt tension is produced only by the force of the tension provider, the seat belt 3 is retained in this belt tension even when the electric motor 40 is stopped.

When the condition for operating in the warning mode is met, the electric motor 40 slowly rotates in the winding direction β after the predetermined period. The seat belt 3 is thus further tensioned by the driving force of the electric motor 40. As the belt tension reaches the first preset belt tension (2–3 kgf), the electric motor 40 is stopped. In this way, the occupant restraint system is set in the warning mode. In the warning mode, since the electric motor 40 is stopped and the gear holed 26 is not held, the belt tension is gradually reduced. The belt tension of the seat belt 3 becomes finally equal to the level of the force provided by the tension provider 8.

When the condition for operating in the emergency mode is met, the electric motor 40 rapidly rotates in the winding direction β after the predetermined period. The seat belt 3 is thus further tensioned by the driving force of the electric motor 40. As the belt tension reaches the second preset belt tension (greater than 5 kgf), the electric motor is stopped. In this way, the emergency mode is set. In the emergency mode, since the electric motor 40 is stopped and the gear holed 26 is not held in the same way as the warning mode, the belt tension is gradually reduced. The belt tension of the seat belt 3 becomes finally equal to the level of the force provided by the tension provider 8.

When one of the conditions for operating in the comfort mode is met again during the system operates in other mode, for example a case where the possibility of collision is eliminated, the occupant restraint system is set in the comfort mode in the same way as described above.

When the condition for operating in the warning mode is met during the comfort mode, the condition for operating in the emergency mode is met during the comfort mode, or the condition for operating in the emergency mode is met during the precautionary mode, the electric motor 40 is driven to further rotate in the winding direction β and the system is set in the warning mode or the emergency mode.

When one of the conditions for operating in the precautionary mode is met during the warning mode or the emergency mode, since the motor is stopped and the belt tension is thus produced only by the force of the tension provider 8 in the warning mode or the emergency mode as well as the precautionary mode, the system is set in the precautionary mode without rotation of the electric motor 40.

When the condition for operating in the warning mode during the emergency mode, since the belt tension is produced only by the force of the tension provider 8 in the emergency mode, the electric motor 40 is driven to rotate in the winding direction β. In the same manner as setting in the precautionary mode, the electric motor 40 is stopped when the belt tension reaches the first preset belt tension.

When the occupant stops the vehicle and releases the engagement between the buckle and the tongue, the condition for operating in the precautionary mode. Therefore, in the same manner as setting the precautionary mode mentioned above, after the predetermined period, the electric motor 40 is driven to slowly rotate in the winding direction β for a slight period of time, thereby canceling the hold of the gear holder 26. The real shaft 4 is thus biased only by the biasing force of the tension provider 8 so that the seat belt 3 is wound by the biasing force. After the predetermined period (a few seconds) from stopping the electric motor 40, the electric motor 40 is driven again to slowly rotate in the winding direction β for a slight period of time, thereby completely winding up the seat belt 3 onto the reel shaft 4.

It should be understood that when the occupant restraint system is set in each mode, not to mention the comfort mode, it can provide the same actions as the conventional seat belt retractor as mentioned above, i.e. provide the actions of the seat belt lock 5, the deceleration sensor 6, and the pawl 10.

Though the belt tension is gradually reduced after reaching the first or second preset belt tension for setting in the warning mode or the emergency mode in the embodiment mentioned above, the belt tension may be held in the first and second belt tension during the warning mode or the emergency mode according to the present invention. In this case, the rotation of the electric motor 40 is suitably controlled by, for example, pulse controlling.

Though there are four modes for the occupant restraint system in the embodiment mentioned above, the number of modes is not limited to this number. For example, the precautionary mode and the warning mode may be combined to one mode so that three modes are available for the occupant restraint system.

Figure 15A:
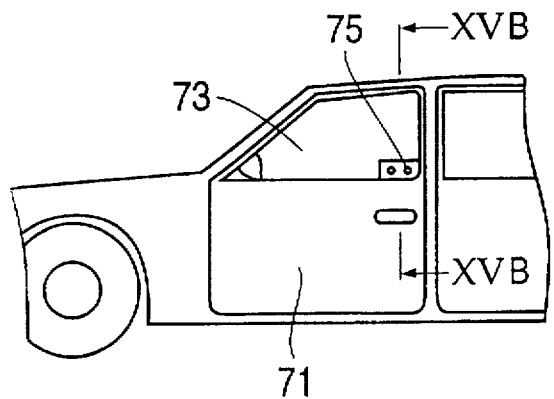
FIG. 15A shows a schematic partial view of the left side of a vehicle.
Figure 15B:
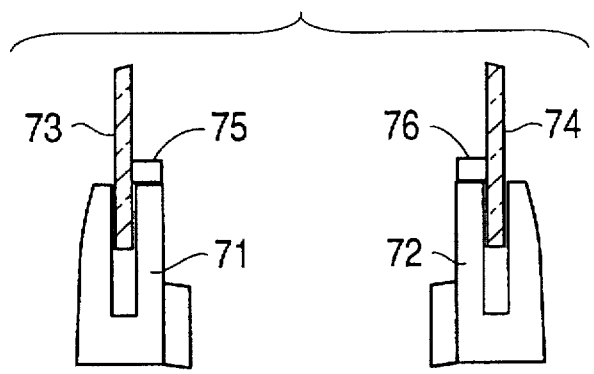
FIG. 15B shows a sectional view taken along line XVB—XVB of FIG. 15A, for explaining mounting positions of the left and right object detection sensors used in another embodiment of the present invention.

FIGS. 15A and 15B show another embodiment of the present invention. FIG. 15A shows a schematic partial view of the left side of a vehicle. FIG. 15B shows a sectional view taken along line XVB—XVB of FIG. 15A. It should be noted that the same components as the components of the aforementioned embodiment are numbered the same so that the detail descriptions for the same components will be omitted.

An occupant restraint system for a vehicle according to this embodiment is a system for controlling a seat belt retractor corresponding to the condition of the vehicle relative to an object at the right or left side of the vehicle. As shown in FIGS. 15A and 15B, the vehicle is provided with left and right object detection sensors 75, 76 which are disposed along opening edges for windows of left-side and right-side front doors 71, 72 at the cabin side with respect to the windows 73, 74, respectively. The left object detection sensor 75 detects an object at the left side of the vehicle and the right object detection sensor 76 detects an object at the right side of the vehicle. The left and right object detection sensors 75, 76 may be disposed to any other portions than the opening edges for the windows of the left-side and right-side front doors 71, 72, if only the left and right object detection sensors 75, 76 are allowed to detect objects at the left and right sides of the vehicle.

The left and right object detection sensors 75, 76 may be structured the same as the front object detection sensor 43 for detecting an object in a front of the vehicle as shown in FIGS. 7, 8A and 8B. It should be noted that though the description will be made using optical sensor, other object detector using, for example, millimeter waves, ultrasonic waves, or image recognition may be employed as the left and right object detection sensors 75, 76.

Though lamps of light sources and optical sensors of light receiving parts are not illustrated, these are connected to CPU 42 in the same manner as the lamps 49 of the light source and the optical sensor 52 of the light receiving part of the front object detection sensor 43 so that on and off of the lamps are controlled by the control signals from the CPU 42 and object detection signals from the optical sensors are transmitted to the CPU 42.

In the occupant restraint system of this embodiment, three modes: a comfort mode; a warning mode; and an emergency mode are set for controlling the winding and unwinding of the seat belt 3. Winding forces set in the comfort mode, the warning mode, and the emergency mode are set in the same respective values as the winding forces in those modes for the seat belt 3 in consideration of the object in front of the vehicle as described with regard to FIG. 12. Conditions for setting the occupant restraint system in each of the aforementioned modes are set as shown in Table 1 as follows:

TABLE 1

| Time Period until Collision (sec.) | Mode |
|---|---|
| Ssr ≦ δ | Emergency Mode |
| δ < Ssr ≦ ε | Warning Mode |
| ε ≦ Ssr | Comfort Mode |

Examples: δ=0.2 sec. ε=0.5 sec.

Based on the value of the time period until collision Ssr corresponding to the condition of the vehicle relative to the object at a side of the vehicle, the occupant restraint system is set in the emergency mode when the time period until collision Ssr is less than the first preset value δ sec. (e.g. 0.2 sec.), the system is set in the warning mode when the time period until collision Ssr is more than the first preset value δ and less than the second preset value ε sec., and the system is set in the comfort mode when the time period until collision Ssr is more than the second preset value ε sec (ε>δ; e.g., ε=0.5 sec.)

For obtaining the time period until collision Ssr, when an object is detected at a side of the vehicle, the relative distance Dsr and the relative speed Vsr between the vehicle and the detected object are first obtained.

Then, the time period until collision Ssr is found using Expression 3 with these values Dsr and Vsr as follows:
Expression 3

$$Ssr = Dsr/Vsr$$

Ssr: Time period until collision
Dsr: Side direction relative distance
Vsr: Side direction relative speed In this embodiment, the object detection signals from both of the left and right object detection sensors 75, 76 are transmitted to the CPU 42 and it is decided that the system is set in which mode, by using OR of the left and right object detection signals. That is, when an object is detected at either left side or right side of the vehicle, not to mention at both sides, one of the modes to be set is decided according to the object detection signals. In case where objects are detected at both sides, when the comfort mode is decided for the condition between one of the objects and the vehicle and the warning mode or emergency mode is decided for the condition between the other object and the vehicle, the occupant restraint system is set in the warning mode or the emergency mode. Moreover, when the warning mode is decided for the condition between one of the objects and the vehicle and the emergency mode is decided for the condition between the other object and the vehicle, the occupant restraint system is set in the emergency mode. That is, when different modes are decided for respective sides, the occupant restraint system is set in a mode having greater belt tension.

On the other hand, when no object is detected at both sides of the vehicle, both the side direction relative distance Dsr and the side direction relative speed Vsr are 0. In this case, the time period until collision Ssr can not be computed using Expression 3. In this embodiment, therefore, when no object is detected at both sides of the vehicle, the occupant restraint system is set in the comfort mode. In other words, when both the relative distance Dsr and the relative speed Vsr are 0, the time period until collision Ssr is preset at a predetermined value γ sec. more than the second preset value ε (e.g. when ε is 0.5 sec., γ is 1.0 sec.).

When an object is getting closer diagonally from a side to the vehicle, the components in the side directions of the vehicle are used as the side direction relative distance Dsr and the side direction relative speed Vsr in Expression 3 to obtain the time period until collision Ssr. Using the obtained time period until collision Ssr, the mode to be set for the occupant restraint system is decided based on the conditions shown in Table 1 in the same manner as mentioned above. In addition, for example, when an oncoming vehicle is running on the inner track of a curve during the vehicle is running on the outer track of the curve, the components in the side directions of the vehicle are used as the relative distance Dsr and the relative speed Vsr to obtain the time period until collision Ssr in the same manner as the case where the object is getting closer diagonally from a side to the vehicle. In this case, since there is a possibility that the oncoming vehicle gets closer significantly to the vehicle and the oncoming vehicle runs over the center line such as when the speed of the oncoming vehicle is relatively high, either one of the comfort mode and the emergency mode may be set for running at a curve. In other words, the occupant restraint system is set in the comfort mode when the time period until collision Ssr is more than the second preset value ε, and the system is set in the emergency mode when the time period until collision Ssr is less than the second preset value ε. There is some methods for detecting that the vehicle is running at a curve, for example, by detecting the angle of the steering wheel by a steering angle sensor.

Moreover, when the vehicle and an oncoming vehicle just pass each other, the side direction relative speed Vsr is 0. Therefore, since the time period until collision Ssr is more than the preset value ε according to Expression 3, the occupant restrict protection system is set in the comfort mode.

Since the other structures, a belt tension controlling method, a control block, a control timing are the same as those of the aforementioned embodiment, the descriptions of them will be omitted.

Figure 16:
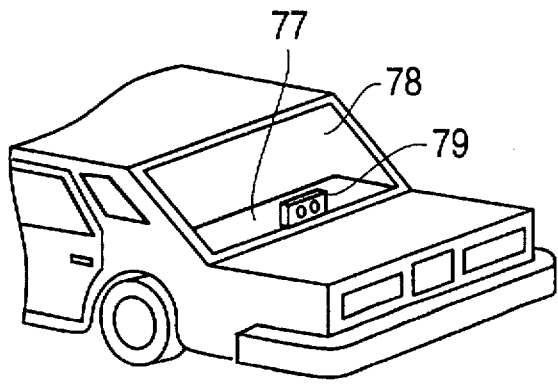
FIG. 16 shows a perspective view for explaining the mounting position of the behind object detection sensor used in another embodiment of the present invention.

FIG. 16 is a perspective view partially showing another embodiment of the present invention. It should be noted that the same components as the components of the aforementioned embodiment are numbered the same so that the detail descriptions for the components will be omitted.

An occupant restraint system for a vehicle according to this embodiment is a system for controlling a seat belt retractor corresponding to the condition of the vehicle relative to an object behind the vehicle. As shown in FIG. 16, the vehicle is provided with a behind object detection sensor 79, for example, disposed on a rear bulk storage panel 77 at the cabin side with respect to the rear windshield 78. The behind object detection sensor 79 detects an object behind the vehicle. The behind object detection sensor 79 may be disposed to any other portion than the rear bulk storage panel 77, if only the behind object detection sensor 79 is allowed to detect an object behind the vehicle.

The behind object detection sensor 79 may be structured the same as the front object detection sensor 43 for detecting an object in a front of the vehicle as shown in FIGS. 7, 8A and 8B. It should be noted that though the description will be made using optical sensor, other object detector using, for example, millimeter waves, ultrasonic waves, or image recognition may be employed as the behind object detection sensors 79.

Though lamps of light sources and an optical sensor of a light receiving part are not illustrated, these are connected to CPU 42 in the same manner as the lamps 49 of the light source and the optical sensor 52 of the light receiving part of the front object detection sensor 43 so that on and off of the lamps is controlled by the control signals from the CPU 42 and an object detection signal from the optical sensor is transmitted to the CPU 42.

In the occupant restraint system of this embodiment, four modes: a comfort mode; a precautionary mode, a warning mode; and an emergency mode are set in the same manner as controlling the winding and unwinding of the seat belt 3 in consideration of the object in front of the vehicle according to the embodiment described with regard to FIG. 12 and, winding forces are also set in the same values as the embodiment described with regard to FIG. 12.

As shown in FIG. 17, in this embodiment, three conditions set for operating the occupant restraint system in the comfort mode are: (1) that no object is detected; (2) that a detected object never get closer; and (3) that even when a detected object tends to get closer, the occupant has enough time for avoiding the object, or the occupant is already avoiding the object.

For deciding that one of the conditions of comfort mode is met, the CPU 42 decides that no object detection signal is outputted from the behind object detection sensor 79, that the difference between the vehicle speed and the speed of the object i.e. the relative speed between the vehicle and the object is 0 or more, i.e. the relative speed≧0, if the object detection signal is outputted from the behind object detection sensor 79, or that no other mode is set.

Two conditions set for operating the occupant restraint system in the comfort mode are: (1) that the occupant is wearing or taking off the seat belt 3; and (2) that, when a detected object tends to get closer during the vehicle runs at a speed higher than 10–20 km/h, the occupant has not enough time for avoiding the object.

For deciding that one of the conditions is met, the first condition is judged by detecting whether the engagement between the tongue and the buckle is accomplished or released. That is, a detecting sensor is installed in at least either of the tongue or the buckle so as to judge whether the engagement between the tongue and the buckle is accomplished or released, by an output signal from the detecting sensor.

On the other hand, the second condition is judged by deciding whether the vehicle speed Vs is higher than 10–20 km/h (Vs≧10–20 km/h). When it is decided that the vehicle speed Vs is higher than 10–20 km/h, the relative distance Dr and the relative speed Vr between the vehicle and the object in the front-rear direction are obtained from the object detection signal from the behind object detection sensor 79. Where the vehicle speed Vs is higher than the relative speed Vr and the relative speed Vr is positive (Vs>Vr≧0), (i) it is decided that the object is a following vehicle running in the same direction and the relative distance tends to be shorten, i.e. case of follow driving. In addition, where the vehicle speed Vs is less than the relative speed Vr, (ii) it is decided that the object is a stationary or an oncoming vehicle.

In case of (i) above, i.e., follow driving:

The safe distance Ds from the following vehicle when the vehicle is accelerated at the same acceleration a (for example 4–6 m/sec²) is obtained by Expression 4 as follows:

Expression 4

$$Ds = Vs \cdot Td - a \cdot Td^2 + De$$

Vs: Vehicle Speed
Ds: Safe Distance between Vehicles
Td: Response Delay of Driver (0.5–1.0 sec.)
a: Preset Acceleration (e.g. 4–6 m/sec²)
De: First Preset margin Distance (e.g. 5 m)

When the relative distance Dr is less than the safe distance Ds (Dr≦Ds), it is decided that the two conditions are met.

In case of (ii) above, i.e., stationary or oncoming vehicle:

The safe distance Ds from the stationary or oncoming vehicle when the vehicle is accelerated at the same acceleration a is obtained by Expression 5 as follows:

Expression 5

$$Ds = Vs \cdot Td - Vr^2/2a + De$$

Vs: Vehicle Speed
Ds: Safe Distance from object
Td: Response Delay of Driver (0.5–1.0 sec.)
a: Preset Acceleration (e.g. 4–6 m/sec²)
De: First Preset margin Distance (e.g. 5 m)

When the relative distance Dr is less than the safe distance Ds (Dr≦Ds), it is decided that the two conditions are met.

The condition for operating the occupant restrictive protection system in the warning mode is (1) that the detected object tends to get closer and immediate movement of the occupant to avoid the object is necessary.

A method of deciding whether the condition for operating in the warning mode is met is substantially the same as the precautionary mode. The safe distance Ds is obtained using Expressions 4 and 5. When the relative distance Dr is less than the safe distance Ds, it is decided that the condition (1) is met. In this warning mode, however, a second preset margin distance (e.g. 2 m) shorter than the first preset margin distance (e.g. 5 m) of the safe distance Ds for the precautionary mode is used instead of first preset margin distance used in Expressions 4 and 5 to obtain the safe distance Ds.

The condition for operating the occupant restrictive protection system in the emergency mode is (1) that the occupant can not avoid a collision with the detected object.

For deciding whether the condition is met, it is first decided whether the vehicle speed Vs is less than 10–20 km/h. When the vehicle speed Vs is less than 10–20 km/h (Vs≦10–20 km/h), the relative speed Vr and the relative distance Dr between the vehicle and the object are obtained from the object detecting signal from the behind object detection sensor 79. On the other hand, a distance (Vr·Ts) converted with a predetermined completion time Ts (e.g. 0.3 sec.) of the system based on the relative speed Vr is obtained. There is a third preset margin distance De' (for example, 2 m), then the sum (Vr·Ts+De') of the converted distance (Vr·Ts) of the completion time Ts and the third preset margin distance De' is obtained. Whether the object is a following vehicle or not, when the relative speed Vr is less than the sum (Vr·Ts+De') (i.e. Vr≦Vr·Ts+De'), it is decided that the condition for the emergency mode is met.

Since the operations for setting the occupant restraint system in the respective modes in this embodiment are the same as the operations in case of the object in front of the vehicle, and the other structures, a belt tension controlling method, a control block, a control timing are the same as those of the aforementioned embodiment, the descriptions of them will be omitted.

Figure 18:
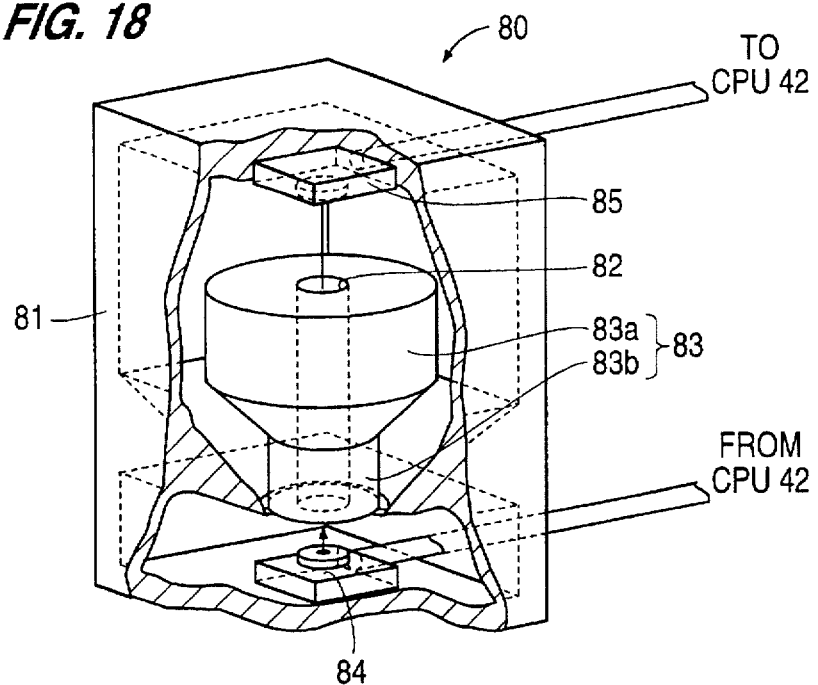
FIG. 18 shows a perspective view showing further another embodiment of the present invention, with parts being partially broken away.
Figure 19A:
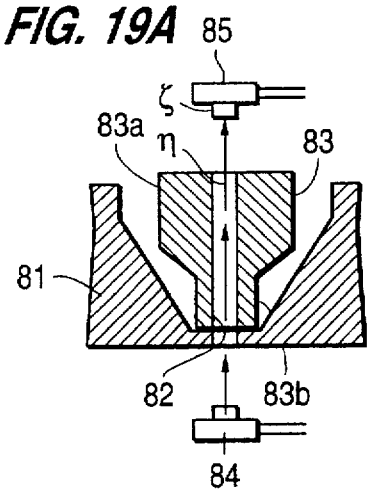
FIG. 19A shows a view of the roll-over detection sensor in non operation.
Figure 19B:
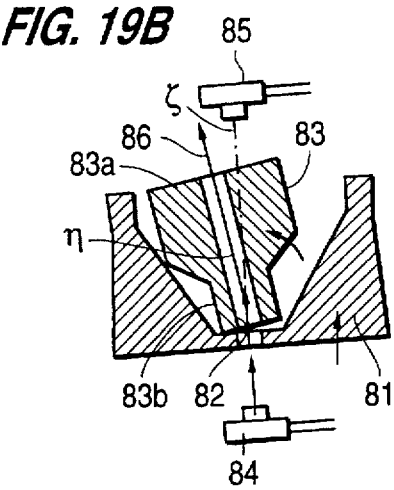
FIG. 19B shows a view of it in operation, explaining the operation of the roll-over detection sensor as shown in FIG. 18.

FIG. 18 is a perspective view showing further another embodiment of the present invention, with parts being partially broken away, and FIGS. 19A and 19B are views for explaining the operation of this embodiment. It should be noted that the same components as the components of the aforementioned embodiments are numbered the same so that the detail descriptions for the components will be omitted.

An occupant restraint system for a vehicle according to this embodiment is a system for controlling a seat belt retractor when the vehicle is rolling over. A roll-over detecting sensor 80 (corresponds to a vehicle condition detector) as shown in FIG. 18 is built in the seat belt retractor or CPU 42. The roll-over detecting sensor 80 may be disposed to other portion than the seat belt retractor or the CPU 42 if only the roll-over detecting sensor 80 is allowed to detect when the vehicle is rolling over.

As shown in FIG. 18, the roll-over detecting sensor 80 comprises a standing weight 83 having a through hole 82 extending axially in the center thereof, a light emitter 84 emitting light (e.g. infrared ray as shown in a arrow) which is transmitted through the through hole 82 when the standing weight 83 stands up straight, and a light receiver 85 which is capable of receiving the light transmitted through the through hole 82 when the standing weight 83 stands up straight.

The standing weight 83 comprises a large-diameter portion 83a of which section is circular and a small-diameter portion 83b of which section is also circular. The standing weight 83 is disposed to stand up in a casing 81 so that the large-diameter portion 83a is positioned above the small-diameter portion 83b. The light emitter 84 and the light receiver 85 are connected to the CPU 42. The light emitted from the light emitter 84 is controlled by control signals from the CPU 42 and the light received by the light receiver 85 is converted to the electric signal and outputted to the CUP 42.

The standing weight 83 is set to stand up straight as shown in FIG. 19A in the normal condition when the vehicle is not rolling over. When the standing weight 83 stands up straight, the optical axis ζ of the light emitter 84, the axis η of a hole (not numbered) of the casing 81, the axis η of the through hole 82 of the standing weight 83, and the optical axis ζ of the light receiver 85 are all arranged in a line. Therefore, the light emitted from the light emitter 84 (as shown in arrows not numbered) is received by the light receiver 85 through the hole of the casing 81 and the through hole 82 of the standing weight 83. That is, when the light from the light emitter 84 is received by the light receiver 85, the vehicle is not rolling over so that the roll-over detecting sensor 80 detects non rolling over state of the vehicle.

When the vehicle rolls over at an angle exceeding a predetermined angle, the standing weight 83 tilts largely until the large-diameter portion 83a of the standing weight 83 comes into contact with the casing 81 as shown in FIG. 19B. When the standing weight 83 is in this state, the axis η of the through hole 82 of the standing weight 83 is sifted from the optical axis ζ of the light emitter 84, the axis η of the hole (not numbered) of the casing 81, and the optical axis ζ of the light receiver 85 not to be arranged in a line. Since the light emitted from the light emitter 84 is transmitted along the through hole 82 of the standing weight after transmitted through the hole of the casing 81, the light is sifted from the optical axis ζ of the light receiver 85 so that the light is not received by the light receiver 85 as shown in an arrow 86. In other words, when the light from the light emitter 84 is not received by the light receiver 85, the vehicle rolls over and the roll-over detecting sensor 80 detects that the vehicle is rolling over.

Figure 20:
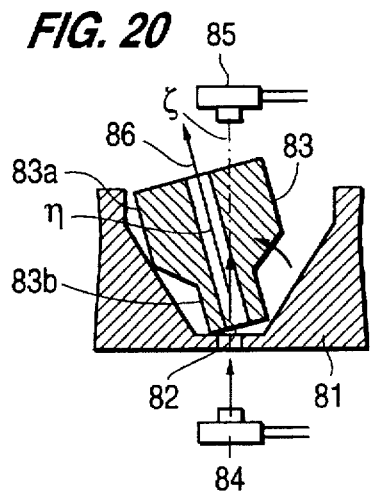
FIG. 20 shows a view for explaining another operation of the roll-over detection sensor.

Moreover, in this embodiment, as shown in FIG. 20, even when the vehicle is not rolling over, the standing weight 83 tilts so that the light from the light emitter 84 is not received by the light receiver 85 when the centrifugal force of the vehicle turning sharply at a curve exceeds a predetermined value, when the inertial force of emergency braking of the vehicle exceeds a predetermined value, or when the impact force of a collision from any directions exceeds a predetermined value.

Since the other structures, a belt tension controlling method, a control block, a control timing are the same as those of the aforementioned embodiments, the descriptions of them will be omitted.

In this embodiment, the standing weight 83 is set not to tilt even when the vehicle ascends or descends a steeply slanting slope or even when the vehicle turns a curve having a significant cant tilting largely. In this way, the occupant restraint system is prevented from being set in the emergency mode unnecessarily. However, the standing weight 83 may be set to tilt even such cases mentioned above. In this case, the occupant restraint system is set in the emergency mode even when the vehicle tilt largely like the above cases, thereby further securely restraining the occupant by the seat belt.

Though, in this embodiment, the small-diameter portion 83b of the standing weight 83 is formed to have a circular section, the small-diameter portion 83b may be formed to have a section of various shapes such as ellipse, square, rectangle, and polygon. In this case, when the small-diameter portion 83b is formed to easily allow the standing weight 83 to tilt in a predetermined direction, the roll-over detection sensor 80 can provide a high detection sensibility in the predetermined direction. Therefore, it is possible to change the mode of the occupant restraint system according to the direction of the vehicle, thereby providing further delicate control.

Though, in the above embodiments, the belt tension is controlled corresponding to only one of the conditions such as the condition of the vehicle relative to an object in front of or behind the vehicle, the condition of the vehicle relative to an object at the right or left side of the vehicle, or the condition of the vehicle, the belt tension may be controlled corresponding a plurality of conditions among the above conditions, according to the present invention. In this case, the belt tension is controlled using OR of a plurality of modes which are set based on the plurality of conditions. When a plurality of modes set for the same period provide different tensions, a mode providing greater belt tension is selected to perform the belt tension control.

Furthermore, the reel shaft 4, the seat belt lock 5, deceleration sensor 6, and the tension provider 8 used in the seat belt retractor in the above embodiments may be of other conventional types. When the reel shaft 4 is controlled upon measuring the winding rate of the webbing of the reel shaft 4 and the deceleration of the vehicle in the normal condition by the electric motor 40, the central processing unit 42, the object detector, the deceleration sensor 6 and the tension provider 8 can be omitted.

Though, in the above embodiments, the belt tension control mechanism 7 comprises the electric motor 40, the first gear transfer mechanism 38, the drive side gear clutch 30, the driven side gear clutch 32, and the second gear transfer mechanism 39, according to the present invention, the belt tension control mechanism 7 is not limited to this and may be comprise a motor, for example an ultrasonic motor disclosed in Japanese Laid-Open Patent No. 59-122385/1984, which is controlled by the CPU to stop to prevent the rotation of the reel shaft 4 during the electricity is off even when the reel shaft 4 is applied with a rotational force less than a predetermined value, and to rotate to directly rotate the reel shaft 4 during the electricity is on. The seat belt lock 5, the deceleration sensor 6, the tension provider 8, and the gear transfer mechanism can be omitted by using such a motor.

As apparent from the above description, according to the present invention, the occupant restraint system controls the seat belt retractor in consideration of the condition of the vehicle relative to a nearby object and/or the condition of the vehicle whether the vehicle is rolling over, is braking hard, or is turning sharply, thereby controlling the belt tension of the seat belt to a predetermined value depending on the conditions as mentioned above. Therefore, it is capable of protecting the occupant more efficiently and conformably in an emergency.

Particularly, a predetermined number of modes are set depending on the condition of the vehicle relative to nearby objects and preset values of the belt tensions are set for each mode, thereby more delicately and easily protecting the occupant in an emergency.

What is claimed is:

1. A vehicle occupant restraint system for protecting an occupant by preventing the unwinding of a seat belt when necessary, using a seat belt retractor comprising a reel shaft on which the seat belt is wound up, a frame supporting both ends of the reel shaft in such a manner that the shaft can rotate freely, and a lock located between the frame and the reel shaft which permits the reel shaft to rotate in normal conditions but prevents the reel shaft from rotating to unwind the seat belt when necessary; wherein the occupant restraint system further comprises:

a belt tension control mechanism controlling the rotation of said reel shaft;

an object detector which detects an object in proximity to the vehicle; and a central processing unit for determining the condition of the vehicle relative to the objects based on a detection signal from the object detector and controlling the belt tension control mechanism based on a result of the determination, to control the belt tension of said seat belt to a predetermined tension depending on the condition of the vehicle relative to the object.

2. A vehicle occupant restraint system as claimed in claim 1, wherein said object detector is at least one of a front object detector, a side object detector capable of detecting objects on at least one side of the vehicle, and a rear object detector.

3. A vehicle occupant restraint system as claimed in claim 1, wherein a predetermined number of modes are set depending on the condition of said vehicle relative to the object, and preset values of said belt tension are set for each mode.

4. A vehicle occupant restraint system as claimed in claim 3, wherein said modes comprise at least a comfort mode where the preset value of said belt tension is set at approximately 0; a precautionary mode where the preset value of said belt tension is set at a first predetermined level, and a warning mode where the preset value of said belt tension is set at a second predetermined level greater than the first predetermined level.

5. A vehicle occupant restraint system as claimed in claim 3, wherein said modes comprise at least a comfort mode where the preset value of said belt tension is set at approximately 0, a precautionary mode where the preset value of said belt tension is set at a first predetermined level, a warning mode where the preset value of said belt tension is set at a second predetermined level greater than the first predetermined level, and an emergency mode where the preset value of said belt tension is set at a third predetermined level greater than the second predetermined level.

6. A vehicle occupant restraint system as claimed in claim 1, further comprising a vehicle condition detector that detects the condition of the vehicle such as whether the vehicle is rolling over, is braking hard, or is turning sharply, wherein said central processing unit determines the condition of the vehicle relative to the object based on the detection signal from said object detector and controls the tension of the seat belt to a predetermined tension based on the result of the determination.

7. A vehicle occupant restraint system for protecting an occupant by preventing the unwinding of a seat belt when necessary, using a seat belt retractor comprising a reel shaft on which the seat belt is wound up, a frame supporting both ends of the reel shaft in such a manner that the shaft can rotate freely, and a lock located between the frame and the reel shaft which permits the reel shaft to rotate in normal conditions but prevents the reel shaft from rotating to unwind the seat belt when necessary; wherein the occupant restraint system further comprises:

a belt tension control mechanism controlling the rotation of the reel shaft;

a vehicle condition detector which detects the condition of a vehicle regarding whether said vehicle is rolling over, a brake of the vehicle is pressed hard, or the vehicle is turning sharply; and a central processing unit which determines the condition of the vehicle based on a detection signal from said vehicle condition detector and controls said belt tension control mechanism based on a result of the determination, to control the belt tension of the seat belt to a predetermined tension corresponding to the condition of the vehicle.

8. A vehicle occupant restraint system as claimed in claim 7, wherein a predetermined number of modes are set depending on the conditions of the vehicle, and preset values of said belt tension are set for each mode.

9. A vehicle occupant restraint system as claimed in claim 8, wherein said modes comprise at least a comfort mode where the preset value of said belt tension is set at approximately 0, a precautionary mode where the preset value of said belt tension is set at a first predetermined level, and a warning mode where the preset value of said belt tension is set at a second predetermined level greater than the first predetermined level.

10. A vehicle occupant restraint system as claimed in claim 8, wherein said modes comprise at least a comfort mode where the preset value of said belt tension is set at approximately 0, a precautionary mode where the preset value of said belt tension is set at a first predetermined level, a warning mode where the preset value of said belt tension is set at a second predetermined level greater than the first predetermined level, and an emergency mode where the preset value of said belt tension is set at a third predetermined level greater than the second predetermined level, are set as said predetermined number of modes.

11. A vehicle occupant restraint system as claimed in claim 1, wherein said belt tension control mechanism comprises a motor controlled by the central processing unit and a gear transferring mechanism for transferring the driving force of said motor to the reel shaft.

12. A vehicle occupant restraint system as claimed in claim 1, wherein said belt tension control mechanism comprises a motor, such as an ultrasonic motor, which is controlled by said central processing unit to stop rotating thereby preventing the rotation of said reel shaft when the electricity is off, even when said reel shaft is applied with a rotational force lower than a predetermined value, and to rotate said reel shaft when the electricity is on.

13. A vehicle occupant restraint system as claimed in claim 7, wherein said belt tension control mechanism comprises a motor controlled by the central processing unit and a gear transferring mechanism for transferring the driving force of said motor to the reel shaft.

14. A vehicle occupant restraint system as claimed in claim 7, wherein said belt tension control mechanism comprises a motor, such as an ultrasonic motor, which is controlled by said central processing unit to stop rotating thereby preventing the rotation of said reel shaft when the electricity is off, even when said reel shaft is applied with a rotational force lower than a predetermined value, and to rotate said reel shaft when the electricity is on.

* * * * *